(12) United States Patent
An et al.

(10) Patent No.: US 10,804,740 B2
(45) Date of Patent: Oct. 13, 2020

(54) WIRELESS POWER RECEIVER AND METHOD OF MANUFACTURING THE SAME

(71) Applicant: LG INNOTEK CO., LTD., Seoul (KR)

(72) Inventors: Jeong Wook An, Seoul (KR); Jung Oh Lee, Seoul (KR); Sung Hyun Leem, Seoul (KR); Yang Hyun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 85 days.

(21) Appl. No.: 16/264,360

(22) Filed: Jan. 31, 2019

(65) Prior Publication Data

US 2019/0165609 A1    May 30, 2019

Related U.S. Application Data

(63) Continuation of application No. 15/430,173, filed on Feb. 10, 2017, now Pat. No. 10,277,071, which is a
(Continued)

(30) Foreign Application Priority Data

Mar. 23, 2012 (KR) .......................... 10-2012-0029987
Jul. 19, 2012 (KR) .......................... 10-2012-0079004

(51) Int. Cl.
*H02J 50/10* (2016.01)
*G06K 19/07* (2006.01)
(Continued)

(52) U.S. Cl.
CPC .............. *H02J 50/10* (2016.02); *B60L 53/12* (2019.02); *G06K 19/0723* (2013.01);
(Continued)

(58) Field of Classification Search
CPC .. H02J 50/10; H02J 50/12; H02J 50/70; H02J 5/005; H02J 7/025; H02J 5/00; H02J 7/02;
(Continued)

(56) References Cited

U.S. PATENT DOCUMENTS 4,947,180 A    8/1990  Scholz
5,574,470 A    11/1996 de Vall
(Continued)

FOREIGN PATENT DOCUMENTS

CN    1462413 A    12/2003
CN    1592986 A    3/2005
(Continued)

OTHER PUBLICATIONS

Office Action dated Feb. 2, 2019 in Chinese Application No. 201710325326.5.
(Continued)

*Primary Examiner* — Robert L Deberadinis
(74) *Attorney, Agent, or Firm* — Saliwanchik, Lloyd & Eisenschenk

(57) ABSTRACT

A wireless power receiver can include a magnetic substrate and a coil configured to wirelessly receive power. The coil can be formed as a conductive layer on the magnetic substrate. A connecting unit can be disposed in a receiving space of the magnetic substrate and can be connected to the coil unit.

20 Claims, 21 Drawing Sheets

Related U.S. Application Data continuation of application No. 15/360,425, filed on Nov. 23, 2016, now Pat. No. 10,270,291, which is a continuation of application No. 13/663,012, filed on Oct. 29, 2012, now Pat. No. 9,806,565.

(51) Int. Cl.
| | | |
|---|---|---|
| *H02J 5/00* | (2016.01) | |
| *H02J 7/02* | (2016.01) | |
| *H04B 5/00* | (2006.01) | |
| *H02J 50/70* | (2016.01) | |
| *B60L 53/12* | (2019.01) | |
| *H01F 41/14* | (2006.01) | |
| *H02J 50/12* | (2016.01) | |
| *H01F 38/14* | (2006.01) | |
| *H04W 4/80* | (2018.01) | |

(52) U.S. Cl.
CPC .......... *H01F 38/14* (2013.01); *H01F 41/14* (2013.01); *H02J 5/005* (2013.01); *H02J 7/025* (2013.01); *H02J 50/12* (2016.02); *H02J 50/70* (2016.02); *H04B 5/0037* (2013.01); *H04B 5/0081* (2013.01); *H04W 4/80* (2018.02); *Y02T 10/7005* (2013.01); *Y02T 10/7072* (2013.01); *Y02T 90/122* (2013.01); *Y02T 90/14* (2013.01); *Y02T 90/16* (2013.01); *Y10T 29/4902* (2015.01)

(58) Field of Classification Search
CPC .... B60L 53/12; G06K 19/0723; G06K 19/07; H01F 38/14; H01F 41/14; H04B 5/0081; H04B 5/0037; H04B 5/00; Y10T 29/4902; H04W 4/80; Y02T 10/7005; Y02T 10/7072; Y02T 90/122; Y02T 90/14; Y02T 90/16
See application file for complete search history.

(56) References Cited

U.S. PATENT DOCUMENTS

| | | |
|---|---|---|
| 6,008,622 A | 12/1999 | Nakawatase |
| 6,575,374 B1 | 6/2003 | Boyadjian et al. |
| 6,950,023 B1 | 9/2005 | Martin |
| 7,113,137 B2 | 9/2006 | Bisig |
| 7,259,672 B2 | 8/2007 | Takei |
| 7,712,672 B2 | 5/2010 | Takahashi et al. |
| 7,971,339 B2 | 7/2011 | Finn |
| 8,159,182 B2 | 4/2012 | Kato et al. |
| 8,177,137 B2 | 5/2012 | Arai |
| 8,514,135 B2 | 8/2013 | Jang et al. |
| 8,792,837 B2 | 7/2014 | Deguchi et al. |
| 8,947,189 B2 | 2/2015 | Maruyama et al. |
| 9,053,406 B2 | 6/2015 | Higashiyama |
| 9,105,967 B2 | 8/2015 | Park |
| 9,165,708 B2 | 10/2015 | Lim et al. |
| 9,276,642 B2 | 3/2016 | Shostak |
| 9,450,303 B2 | 9/2016 | Su et al. |
| 9,460,847 B2 | 10/2016 | Lee et al. |
| 9,484,768 B2 | 11/2016 | Park et al. |
| 9,515,513 B2 | 12/2016 | Suzuki et al. |
| 9,543,653 B2 | 1/2017 | Han et al. |
| 9,553,476 B2 | 1/2017 | An et al. |
| 9,607,757 B2 | 3/2017 | Hirobe et al. |
| 9,673,509 B2 | 6/2017 | Park et al. |
| 9,674,646 B2 | 6/2017 | Jang et al. |
| 9,761,928 B2 | 9/2017 | Han et al. |
| 9,825,484 B2 | 11/2017 | Van Bosch et al. |
| 9,843,215 B2 | 12/2017 | Yeom et al. |
| 9,941,576 B2 | 4/2018 | Ito et al. |
| 9,941,729 B2 | 4/2018 | Peralta et al. |
| 9,941,743 B2 | 4/2018 | Peralta et al. |
| 9,948,129 B2 | 4/2018 | Singh et al. |
| 9,960,629 B2 | 5/2018 | Rajagopalan et al. |
| 9,991,735 B1 | 6/2018 | Yamaguchi et al. |
| 9,991,744 B2 | 6/2018 | Lee et al. |
| 10,003,120 B2 | 6/2018 | Kang et al. |
| 10,014,577 B2 | 7/2018 | Cao |
| 10,063,100 B2 | 8/2018 | Singh et al. |
| 10,110,052 B2 | 10/2018 | Yeom et al. |
| 2003/0141590 A1 | 7/2003 | Kamiya et al. |
| 2005/0046573 A1 | 3/2005 | De Velasco et al. |
| 2005/0072595 A1 | 4/2005 | Cho |
| 2005/0079820 A1 | 4/2005 | Yamashita |
| 2005/0116874 A1 | 6/2005 | El-Mahdawy et al. |
| 2005/0275497 A1 | 12/2005 | Ramadan et al. |
| 2006/0166506 A1 | 7/2006 | Okawa et al. |
| 2007/0001921 A1 | 1/2007 | Takahashi et al. |
| 2007/0007661 A1 | 1/2007 | Burgess et al. |
| 2007/0020932 A1 | 1/2007 | Maruyama et al. |
| 2007/0069961 A1 | 3/2007 | Akiho et al. |
| 2007/0095913 A1 | 5/2007 | Takahashi et al. |
| 2007/0254432 A1 | 11/2007 | Yamazaki et al. |
| 2007/0279002 A1 | 12/2007 | Partovi |
| 2008/0055046 A1 | 3/2008 | Shimizu |
| 2008/0122570 A1 | 5/2008 | Takaishi |
| 2008/0129439 A1 | 6/2008 | Nishikawa et al. |
| 2008/0154178 A1 | 6/2008 | Carter et al. |
| 2008/0164840 A1 | 7/2008 | Kato et al. |
| 2008/0197957 A1 | 8/2008 | Kondo et al. |
| 2008/0200210 A1 | 8/2008 | Lim et al. |
| 2008/0246664 A1 | 10/2008 | Ikemoto et al. |
| 2008/0266748 A1 | 10/2008 | Lee |
| 2008/0303735 A1 | 12/2008 | Fujimoto et al. |
| 2009/0029185 A1 | 1/2009 | Lee et al. |
| 2009/0058358 A1 | 3/2009 | Inoue et al. |
| 2009/0058737 A1 | 3/2009 | Tsujimura et al. |
| 2009/0108974 A1 | 4/2009 | Raggam et al. |
| 2009/0115681 A1 | 5/2009 | Lai et al. |
| 2009/0314842 A1 | 12/2009 | Charrin |
| 2009/0315680 A1 | 12/2009 | Arimura |
| 2010/0156735 A1 | 6/2010 | Nakamura et al. |
| 2010/0265041 A1 | 10/2010 | Almog et al. |
| 2010/0277004 A1 | 11/2010 | Suzuki et al. |
| 2010/0289341 A1 | 11/2010 | Ozaki et al. |
| 2010/0295682 A1 | 11/2010 | August et al. |
| 2010/0308187 A1 | 12/2010 | Lin |
| 2011/0032685 A1 | 2/2011 | Akiba et al. |
| 2011/0050164 A1 | 3/2011 | Partovi et al. |
| 2011/0127070 A1 | 6/2011 | Ahn et al. |
| 2011/0267248 A1 | 11/2011 | Remski et al. |
| 2011/0285494 A1 | 11/2011 | Jeong et al. |
| 2011/0302770 A1 | 12/2011 | Radenne et al. |
| 2011/0312382 A1 | 12/2011 | Itay et al. |
| 2012/0001701 A1 | 1/2012 | Taniguchi et al. |
| 2012/0019075 A1 | 1/2012 | Cho et al. |
| 2012/0044114 A1 | 2/2012 | Eom et al. |
| 2012/0049986 A1 | 3/2012 | Cho et al. |
| 2012/0057322 A1 | 3/2012 | Waffenschmidt |
| 2012/0058722 A1 | 3/2012 | Lo et al. |
| 2012/0092222 A1 | 4/2012 | Kato et al. |
| 2012/0187767 A1 | 7/2012 | Kanno et al. |
| 2012/0218068 A1 | 8/2012 | Yamakawa et al. |
| 2012/0248981 A1 | 10/2012 | Karalis et al. |
| 2012/0249276 A1 | 10/2012 | Fontana et al. |
| 2012/0274148 A1 | 11/2012 | Sung et al. |
| 2013/0038278 A1 | 2/2013 | Park et al. |
| 2013/0038497 A1 | 2/2013 | Chae et al. |
| 2013/0069444 A1 | 3/2013 | Waffenschmidt et al. |
| 2013/0106198 A1 | 5/2013 | Kuk et al. |
| 2013/0113422 A1 | 5/2013 | Lee et al. |
| 2013/0169398 A1 | 7/2013 | Sugita et al. |
| 2013/0176179 A1 | 7/2013 | Park |
| 2013/0200716 A1 | 8/2013 | Kesler et al. |
| 2013/0249302 A1 | 9/2013 | An et al. |
| 2013/0267170 A1 | 10/2013 | Chong et al. |
| 2013/0271328 A1 | 10/2013 | Nickel et al. |
| 2013/0285783 A1 | 10/2013 | Yussof et al. |
| 2013/0308256 A1 | 11/2013 | Lehr et al. |
| 2014/0062827 A1 | 3/2014 | Kato |
| 2014/0091640 A1 | 4/2014 | Scholz et al. |
| 2014/0091758 A1 | 4/2014 | Hidaka et al. |

(56) References Cited

U.S. PATENT DOCUMENTS

| | | |
|---|---|---|
| 2014/0145906 A1 | 5/2014 | Kato et al. |
| 2014/0168019 A1 | 6/2014 | Hirobe et al. |
| 2014/0168026 A1 | 6/2014 | Nakamura et al. |
| 2014/0176384 A1 | 7/2014 | Yosui et al. |
| 2014/0184462 A1 | 7/2014 | Yosui |
| 2014/0210406 A1 | 7/2014 | Na et al. |
| 2014/0226293 A1 | 8/2014 | Sato |
| 2014/0266030 A1 | 9/2014 | Park et al. |
| 2015/0054455 A1 | 2/2015 | Kim et al. |
| 2015/0054457 A1 | 2/2015 | Kim |
| 2015/0061400 A1 | 3/2015 | Park et al. |
| 2015/0077296 A1 | 3/2015 | An et al. |
| 2015/0116178 A1 | 4/2015 | Kim et al. |
| 2015/0123604 A1 | 5/2015 | Lee et al. |
| 2015/0145635 A1 | 5/2015 | Kurz et al. |
| 2015/0171519 A1 | 6/2015 | Han et al. |
| 2015/0207207 A1 | 7/2015 | Park et al. |
| 2015/0222017 A1 | 8/2015 | Kumura et al. |
| 2015/0281873 A1 | 10/2015 | Ojala |
| 2016/0064814 A1 | 3/2016 | Jang et al. |
| 2016/0118711 A1 | 4/2016 | Finn et al. |
| 2016/0126002 A1 | 5/2016 | Chien et al. |
| 2016/0188926 A1 | 6/2016 | Pachler et al. |
| 2016/0204836 A1 | 7/2016 | Lee et al. |
| 2016/0224975 A1 | 8/2016 | Na et al. |
| 2016/0315497 A1 | 10/2016 | Kim et al. |
| 2016/0345125 A1 | 11/2016 | Kim et al. |
| 2017/0040696 A1 | 2/2017 | Peralta et al. |
| 2017/0054213 A1 | 2/2017 | Singh et al. |
| 2017/0213644 A1 | 7/2017 | Lee et al. |
| 2017/0317519 A1 | 11/2017 | Yeom et al. |
| 2017/0338562 A1 | 11/2017 | Ozenne et al. |
| 2017/0345535 A1 | 11/2017 | Kim et al. |
| 2018/0076650 A1 | 3/2018 | Yamaguchi et al. |
| 2018/0189627 A1 | 7/2018 | Kwon et al. |
| 2018/0248255 A1 | 8/2018 | Noh et al. |
| 2018/0287243 A1 | 10/2018 | Ko et al. |

FOREIGN PATENT DOCUMENTS

| | | |
|---|---|---|
| CN | 1784510 A | 6/2006 |
| CN | 1816945 A | 8/2006 |
| CN | 2888666 Y | 4/2007 |
| CN | 101140635 A | 3/2008 |
| CN | 101256876 A | 9/2008 |
| CN | 101573716 A | 11/2009 |
| CN | 101924398 A | 12/2010 |
| CN | 102083280 A | 6/2011 |
| CN | 202120299 U | 1/2012 |
| CN | 102360718 A | 2/2012 |
| CN | 102651499 A | 8/2012 |
| CN | 102971908 A | 3/2013 |
| EP | 02642632 A2 | 9/2013 |
| EP | 02752943 A1 | 7/2014 |
| JP | S56-78415 U | 6/1981 |
| JP | S61-69811 U | 5/1986 |
| JP | H04-51115 U | 4/1992 |
| JP | H06-267746 A | 9/1994 |
| JP | H07-074038 A | 3/1995 |
| JP | H08-79976 A | 3/1996 |
| JP | H10282232 A | 10/1998 |
| JP | H11-175676 A | 7/1999 |
| JP | 2001-027687 A | 1/2001 |
| JP | 2002-299138 A | 10/2002 |
| JP | 2004110854 A | 4/2004 |
| JP | 2004-153463 A | 5/2004 |
| JP | 2004364199 A | 12/2004 |
| JP | 2006-042519 A | 2/2006 |
| JP | 2007-311407 A | 11/2007 |
| JP | 2008-027015 A | 2/2008 |
| JP | 2008-172872 A | 7/2008 |
| JP | 2008-205215 A | 9/2008 |
| JP | 2008-210861 A | 9/2008 |
| JP | 2009033106 A | 2/2009 |
| JP | 2011-66627 A | 3/2011 |
| JP | 2011-097534 A | 5/2011 |
| JP | 2012-008857 A | 1/2012 |
| JP | 2012-010533 A | 1/2012 |
| JP | 2012019302 A | 1/2012 |
| JP | 2012-178959 A | 9/2012 |
| JP | 2012-0191134 A | 10/2012 |
| KR | 1020040063286 A | 7/2004 |
| KR | 10-2005-0120481 A | 12/2005 |
| KR | 10-2006-0008332 A | 1/2006 |
| KR | 10-2008-0074640 A | 8/2008 |
| KR | 10-2010-0130480 A | 12/2010 |
| KR | 10-2012-0016778 A | 2/2012 |
| KR | 10-1177302 B1 | 8/2012 |
| KR | 10-2012-0123375 A | 11/2012 |
| KR | 1020130015618 A | 2/2013 |
| KR | 10-2013-0028301 A | 3/2013 |
| KR | 10-2013-0028302 A | 3/2013 |
| KR | 10-2014-0113205 A | 9/2014 |
| TW | M424550 U1 | 3/2012 |
| WO | WO-2012008693 A2 | 1/2012 |
| WO | WO-2012150293 A1 | 11/2012 |

OTHER PUBLICATIONS

Office Action dated Feb. 25, 2019 in Japanese Application No. 2018-012053.
Dainippon Printing (JP 2008-027015) Translation F5; Feb. 2008.
European Patent Communication dated Oct. 19, 2017, in European Application No. 13763524.9-1806.
European Search Report dated Aug. 29, 2017 in European Application No. 17157643.2.
European Search Report dated Aug. 8, 2017 in European Application No. 16206292.1.
European Search Report dated Feb. 4, 2016 in European Application No. 13763524.9.
European Search Report dated Jul. 1, 2014 in European Application No. 12190583.0.
International Search Report dated Jul. 25, 2013 in International Application No. PCT/KR2013/002406.
International Search Report dated Jul. 26, 2013 in International Application No. PCT/KR2013/002412.
International Search Report in International Application No. PCT/KR2013/002412, filed Mar. 22, 2013.
Murata (JP 2012-191134)—Translated patent; Oct. 2012.
Office Action dated Aug. 10, 2016 in Japanese Application No. 2015-172306.
Office Action dated Aug. 24, 2015 in U.S. Appl. No. 13/663,012.
Office Action dated Aug. 24, 2016 in Taiwanese Application No. 103130766.
Office Action dated Dec. 21, 2015 in Chinese Application No. 201380026460.5.
Office Action dated Feb. 13, 2015 in U.S. Appl. No. 13/663,012.
Office Action dated Feb. 14, 2017 in Japanese Application No. 2015501586.
Office Action dated Feb. 24, 2014 in Korean Application No. 10-2013-0028301.
Office Action dated Feb. 24, 2014 in Korean Application No. 10-2013-0028302.
Office Action dated Jul. 1, 2014 in European Application No. 12190583.0.
Office Action dated Jun. 2, 2016 in U.S. Appl. No. 14/387,521.
Office Action dated Jun. 29, 2016 in Chinese Application No. 201510084340.1.
Office Action dated Nov. 11, 2013 in Korean Application No. 10-2012-0123375.
Office Action dated Nov. 12, 2013 in Japanese Application No. 2012-238615.
Office Action dated Oct. 7, 2014 in Japanese Application No. 2012-238615.
Office Action dated Sep. 28, 2016 in Korean Application No. 1020130028300.
Office Action dated Nov. 27, 2017 in U.S. Appl. No. 15/362,367.
Office Action dated May 2, 2018 in Chinese Application No. 201610391052.5.

(56) References Cited

OTHER PUBLICATIONS

Office Action dated Apr. 30, 2018 in U.S. Appl. No. 15/362,367.
Office Action dated Jun. 15, 2018 in U.S. Appl. No. 15/360,425.
Office Action dated Jul. 10, 2018 in U.S. Appl. No. 15/430,173.
Office Action dated Sep. 29, 2019 in Chinese Application No. 201710325326.5.

| Freq[kHz] | Inductance Setup1 : Sweep | Resistance Setup1 : Sweep | Q Setup1 : Sweep |
|---|---|---|---|
| 130.000000 | 10023.448082 | 0.809633 | 10.012480 |
| 131.000000 | 10021.543951 | 0.814464 | 10.028048 |
| 132.000000 | 10019.649417 | 0.819320 | 10.043115 |
| 133.000000 | 10017.764376 | 0.824199 | 10.057691 |
| 134.000000 | 10015.888496 | 0.829101 | 10.071784 |
| 135.000000 | 10014.021426 | 0.834027 | 10.085405 |
| 136.000000 | 10012.163025 | 0.838976 | 10.098561 |
| 137.000000 | 10010.312867 | 0.843948 | 10.111262 |
| 138.000000 | 10008.470902 | 0.848942 | 10.123517 |
| 139.000000 | 10006.636764 | 0.853960 | 10.135333 |
| 140.000000 | 10004.810399 | 0.859000 | 10.146721 |
| 141.000000 | 10002.991358 | 0.864062 | 10.157687 |
| 142.000000 | 10001.179585 | 0.869147 | 10.168241 |
| 143.000000 | 9999.374809 | 0.874254 | 10.178391 |
| 144.000000 | 9997.577015 | 0.879383 | 10.188142 |
| 145.000000 | 9995.785687 | 0.884534 | 10.197506 |
| 146.000000 | 9994.000944 | 0.889706 | 10.206488 |
| 147.000000 | 9992.222542 | 0.894900 | 10.215097 |
| 148.000000 | 9990.450319 | 0.900116 | 10.223339 |
| 149.000000 | 9988.684063 | 0.905352 | 10.231223 |
| 150.000000 | 9986.923648 | 0.910610 | 10.238756 |
| 151.000000 | 9985.169040 | 0.915889 | 10.245944 |
| 152.000000 | 9983.419964 | 0.921189 | 10.252794 |
| 153.000000 | 9981.676290 | 0.926509 | 10.259313 |
| 154.000000 | 9979.937950 | 0.931850 | 10.265510 |
| 155.000000 | 9978.204783 | 0.937212 | 10.271388 |
| 156.000000 | 9976.476722 | 0.942594 | 10.276956 |
| 157.000000 | 9974.753596 | 0.947996 | 10.282220 |
| 158.000000 | 9973.035485 | 0.953418 | 10.287185 |
| 159.000000 | 9971.321833 | 0.958860 | 10.291859 |
| 160.000000 | 9969.613051 | 0.964321 | 10.296247 |

FIG.22

| Freq[kHz] | Inductance Setup1 : Sweep | Resistance Setup1 : Sweep | Q Setup1 : Sweep |
|---|---|---|---|
| 130.000000 | 10375.469101 | 0.760491 | 11.053420 |
| 131.000000 | 10373.611592 | 0.764922 | 11.072242 |
| 132.000000 | 10371.760893 | 0.769376 | 11.090493 |
| 133.000000 | 10369.916781 | 0.773853 | 11.108182 |
| 134.000000 | 10368.078898 | 0.778351 | 11.125322 |
| 135.000000 | 10366.247102 | 0.782872 | 11.141920 |
| 136.000000 | 10364.421100 | 0.787415 | 11.157989 |
| 137.000000 | 10362.600644 | 0.791979 | 11.173537 |
| 138.000000 | 10360.785303 | 0.796565 | 11.188574 |
| 139.000000 | 10358.975165 | 0.801173 | 11.203109 |
| 140.000000 | 10357.169752 | 0.805802 | 11.217153 |
| 141.000000 | 10355.369156 | 0.810452 | 11.230713 |
| 142.000000 | 10353.572957 | 0.815124 | 11.243801 |
| 143.000000 | 10351.780892 | 0.819816 | 11.256422 |
| 144.000000 | 10349.993078 | 0.824529 | 11.268591 |
| 145.000000 | 10348.209063 | 0.829263 | 11.280309 |
| 146.000000 | 10346.428853 | 0.834018 | 11.291589 |
| 147.000000 | 10344.652133 | 0.838792 | 11.302441 |
| 148.000000 | 10342.878918 | 0.843587 | 11.312871 |
| 149.000000 | 10341.108850 | 0.848402 | 11.322886 |
| 150.000000 | 10339.342085 | 0.853237 | 11.332499 |
| 151.000000 | 10337.578231 | 0.858092 | 11.341712 |
| 152.000000 | 10335.817245 | 0.862967 | 11.350536 |
| 153.000000 | 10334.058946 | 0.867867 | 11.358980 |
| 154.000000 | 10332.303299 | 0.872774 | 11.367050 |
| 155.000000 | 10330.550019 | 0.877706 | 11.374754 |
| 156.000000 | 10328.799305 | 0.882658 | 11.382099 |
| 157.000000 | 10327.050748 | 0.887629 | 11.389091 |
| 158.000000 | 10325.304351 | 0.892618 | 11.395741 |
| 159.000000 | 10323.560143 | 0.897626 | 11.402053 |
| 160.000000 | 10321.817935 | 0.902653 | 11.408035 |

FIG.23

WIRELESS POWER RECEIVER AND METHOD OF MANUFACTURING THE SAME

CROSS-REFERENCE TO RELATED APPLICATIONS

This application is a continuation of U.S. application Ser. No. 15/430,173, filed Feb. 10, 2017; which is a continuation of U.S. application Ser. No. 15/360,425, filed Nov. 23, 2016; which is a continuation of U.S. application Ser. No. 13/663,012, filed Oct. 29, 2012, now U.S. Pat. No. 9,806,565, issued Oct. 31, 2017; which claims the benefit under 35 U.S.C § 119 of Korean Patent Application Nos. 10-2012-0029987, filed Mar. 23, 2012, and 10-2012-0079004, filed Jul. 19, 2012; which are hereby incorporated by reference in their entirety.

BACKGROUND

The embodiment relates to a wireless power receiver and a method of manufacturing the same. In more particular, the embodiment relates to a wireless power receiver used for wireless power transmission or an antenna to reduce a thickness of the wireless power receiver and to simplify the manufacturing process thereof and a method of manufacturing the same.

A wireless power transmission or a wireless energy transfer refers to a technology of wirelessly transferring electric energy to desired devices. In the 1800's, an electric motor or a transformer employing the principle of electromagnetic induction has been extensively used and then a method of transmitting electrical energy by irradiating electromagnetic waves, such as radio waves or lasers, has been suggested. Actually, electrical toothbrushes or electrical razors, which are frequently used in daily life, are charged based on the principle of electromagnetic induction. The electromagnetic induction refers to the generation of an electric current through induction of a voltage when a magnetic field is changed around a conductor. The electromagnetic induction scheme has been successfully commercialized for electronic appliances having small sizes, but represents a problem in that the transmission distance of power is too short.

Besides the electromagnetic induction scheme, the long-distance transmission using the resonance and the short-wavelength radio frequency has been suggested as the wireless energy transfer scheme.

However, in general, a wireless power receiver disposed in a terminal has a thick thickness and the manufacturing process thereof is complicated.

BRIEF SUMMARY

An embodiment provides a method capable of remarkably reducing a thickness of a wireless power receiver by directly disposing a coil unit on a top surface of a magnetic substrate.

An embodiment provides a method capable of ensuring high power transmission efficiency and enabling communication with external devices by directly disposing a coil unit and a near field communication antenna on a top surface of a magnetic substrate.

An embodiment provides a method capable of simplifying the manufacturing process for a wireless power receiver by directly disposing a coil unit on a magnetic substrate.

An embodiment provides a method capable of remarkably reducing a thickness of a wireless power receiver by disposing a coil unit inside a magnetic substrate.

An embodiment provides a method capable of ensuring high power transmission efficiency and enabling communication with external devices by disposing a coil unit inside a magnetic substrate and a near field communication antenna on a magnetic substrate.

An embodiment provides a method capable of simplifying the manufacturing process for a wireless power receiver by disposing a coil unit inside a magnetic substrate.

A wireless power receiver according to one embodiment includes a magnetic substrate and a coil configured to wirelessly receive power, wherein the coil is formed as a conductive layer on the magnetic substrate.

A wireless power receiver according to one embodiment includes a magnetic substrate and a coil a coil configured to wirelessly receive power, wherein the coil is formed as a conductive layer at the magnetic substrate, wherein a part of the coil is disposed inside the magnetic substrate.

A method of manufacturing a wireless power receiver for wirelessly receiving power according to one embodiment includes forming a conductor on a protective film, forming a conductive pattern by etching the conductor, connecting a connecting unit to be connected to an external circuit to a connection terminal of the conductive pattern, obtaining a magnetic substrate having a receiving space of a predetermined shape corresponding to the connecting unit and disposing the magnetic substrate on the conductive pattern while positioning the connecting unit in the receiving space.

According to one embodiment, the thickness of the wireless power receiver can be remarkably reduced by directly disposing the coil unit on a top surface of the magnetic substrate. According to one embodiment, the high power transmission efficiency can be ensured and communication with external devices can be enabled by directly disposing the coil unit and the near field communication antenna on the top surface of the magnetic substrate.

According to one embodiment, the manufacturing process for the wireless power receiver can be simplified by directly disposing the coil unit on the magnetic substrate only through laminating and etching processes.

According to one embodiment, the thickness of the wireless power receiver can be remarkably reduced by forming the conductive pattern inside the magnetic substrate.

According to one embodiment, the high power transmission efficiency can be ensured by forming the conductive pattern inside the magnetic substrate and the communication with external devices can be enabled by using the near field communication antenna.

According to one embodiment, the connecting unit is disposed in the receiving space of the magnetic substrate so that the thickness of the wireless power receiver can be remarkably reduced as much as the thickness of the connecting unit.

According to one embodiment, a tape substrate is used as the connecting unit so that the overall size of the wireless power receiver can be reduced.

According to one embodiment, a lead frame is used as the connecting unit, so the wiring layer included in the connecting unit can be protected from the heat, external moisture or impact and the mass production can be realized.

According to one embodiment, the magnetic field directed to the outside can be changed into the coil unit due to the conductive pattern formed in the magnetic substrate, so the power transmission efficiency can be improved, at the same time, the amount of the magnetic field leaked to the outside can be reduced so that the bad influence of the magnetic field exerted to the human body can be diminished.

According to one embodiment, the wireless power receiver can be manufactured only through the processes of forming the pattern groove and inserting the coil unit, so that the manufacturing process can be simplified.

Other various effects of the embodiments will be disclosed directly or indirectly in the detailed description of the embodiments.

BRIEF DESCRIPTION OF THE DRAWINGS

FIG. 22 is a view for explaining variation of inductance, resistance and Q values of a coil unit 200 as a function of a usable frequency when the coil unit 200 is disposed on a top surface of a magnetic substrate according to the first embodiment;

FIG. 23 is a view for explaining variation of inductance, resistance and Q values of a coil unit 200 as a function of a usable frequency when the coil unit 200 is disposed in a pattern groove formed in a magnetic substrate according to the fifth embodiment;

DETAILED DESCRIPTION

Hereinafter, exemplary embodiments will be described in detail with reference to accompanying drawings so that those skilled in the art can easily work with the embodiments.

Hereinafter, "conductive pattern" refers to the shape of a conductive layer and may be used to refer to a structure formed by a patterning process. "conductive layer" may be used interchangeably with "conductive pattern" and refers to a structure formed by methods including patterning, etching, deposing, selective plating, and the like.

Figure 1:
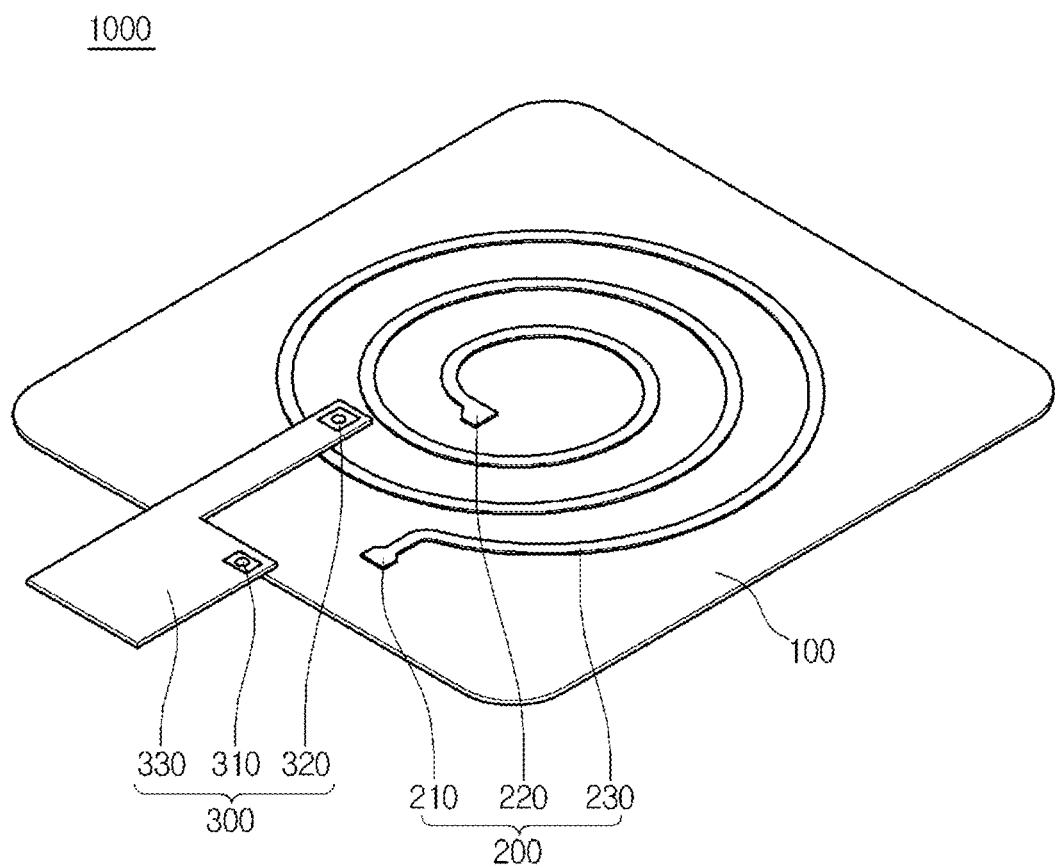
FIG. 1 is a perspective view illustrating a wireless power receiver 1000 according to the first embodiment.
Figure 2:
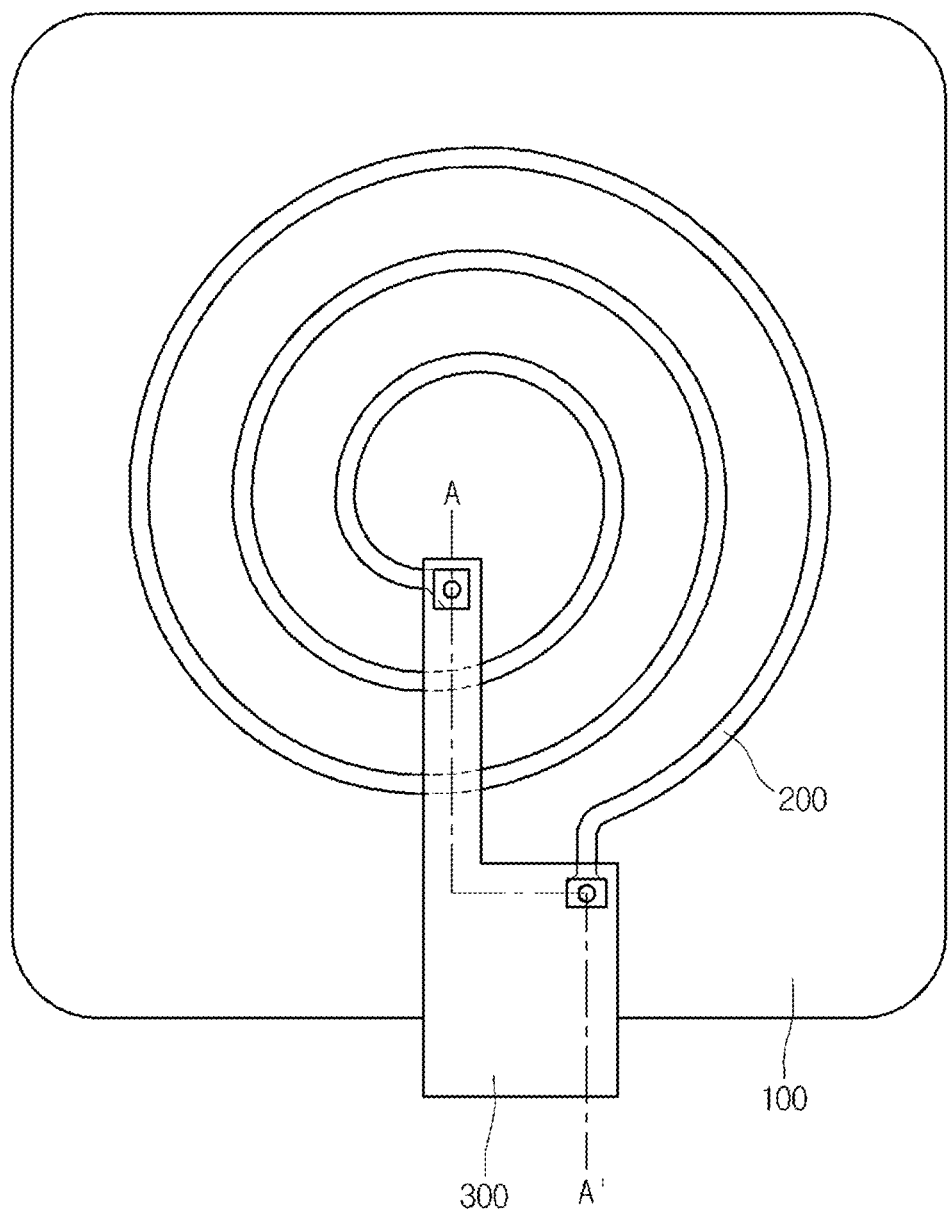
FIG. 2 is a plan view illustrating a wireless power receiver 1000 according to the first embodiment.
Figure 3:
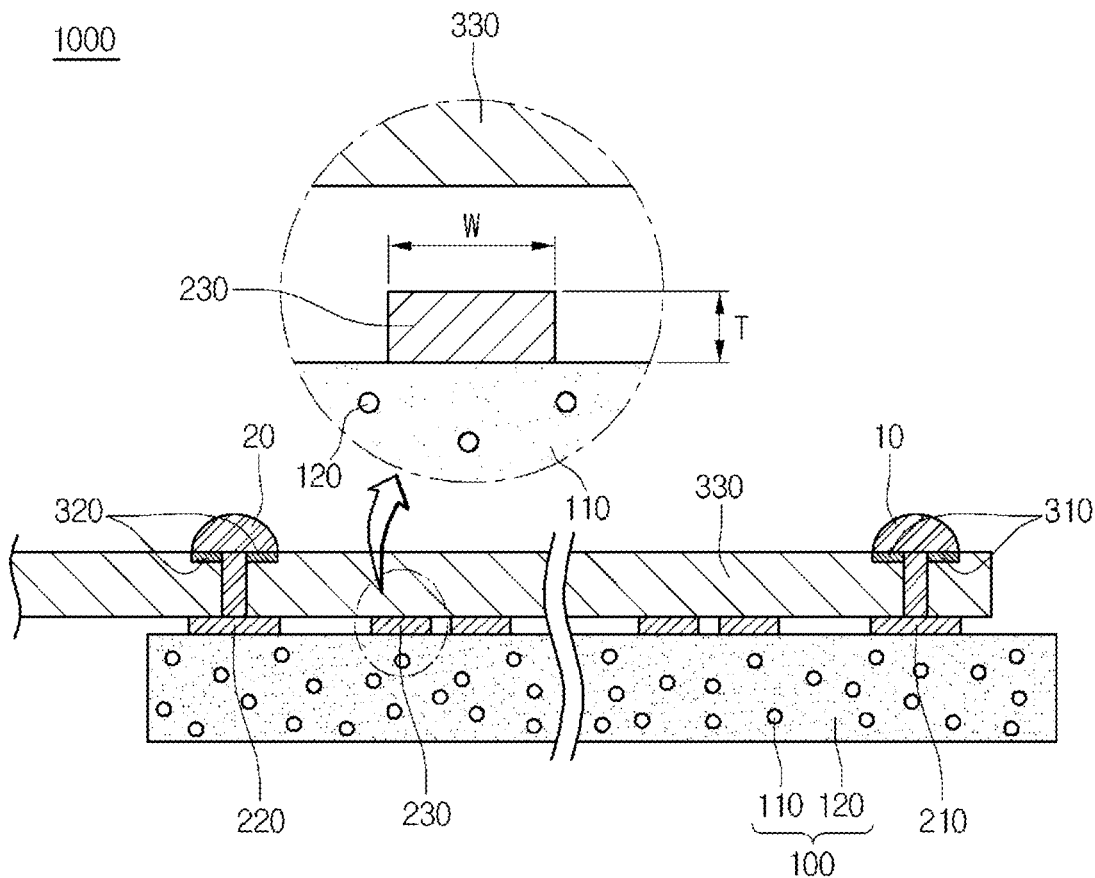
FIG. 3 is a sectional view taken along line A-A' of a connecting unit 300 of a wireless power receiver 1000 shown in FIG. 2.

FIG. 1 is a perspective view illustrating a wireless power receiver 1000 according to the first embodiment, FIG. 2 is a plan view illustrating the wireless power receiver 1000 according to the first embodiment and FIG. 3 is a sectional view taken along line A-A' of a connecting unit 300 of the wireless power receiver 1000 shown in FIG. 2.

Referring to FIGS. 1 to 3, the wireless power receiver 1000 may include a magnetic substrate 100, a coil unit 200 and a connecting unit 300.

The wireless power receiver 1000 may wirelessly receive power from a transmission side. According to one embodiment, the wireless power receiver 1000 may wirelessly receive the power using electromagnetic induction. According to one embodiment, the wireless power receiver 1000 may wirelessly receive the power using resonance.

The electromagnetic induction and resonance may be used when transmitting the power using the magnetic field.

The magnetic substrate 100 may change the direction of the magnetic field received from the transmission side.

The magnetic substrate 100 can reduce the amount of the magnetic field to be leaked to the outside by changing the direction of the magnetic field received from the transmission side.

In detail, the magnetic substrate 100 changes the direction of the magnetic field transferred from the transmission side in the lateral direction such that the magnetic field can be more concentrated onto the coil unit 200.

The magnetic substrate 100 can absorb some of the magnetic field received from the transmission side and leaked to the outside to dissipate the magnetic field as heat. If the amount of the magnetic field leaked to the outside is reduced, the bad influence of the magnetic field exerted on the human body can be reduced.

Referring to FIG. 3, the magnetic substrate 100 may include a magnet 110 and a support 120.

The magnet 110 may include a particle or a ceramic.

The support 120 may include thermosetting resin or thermoplastic resin.

The magnetic substrate 100 may be prepared in the form of a sheet and may have a flexible property.

Referring again to FIG. 1, the coil unit 200 may include a first connection terminal 210, a second connection terminal 220 and a coil 230. The coil 230 may be formed as a conductive layer or a conductive pattern.

The first connection terminal 210 is located at one end of the coil 230 and the second connection terminal 220 is provided at the other end of the coil 230.

The first and second connection terminals 210 and 220 are necessary for connection with the connecting unit 300.

The coil 230 may be formed as a conductive pattern which is obtained by winding a conductive line several times.

According to one embodiment, when viewed from the top, the coil pattern may have a spiral shape. However, the embodiment is not limited thereto, and various patterns may be formed.

The coil unit 200 can be directly disposed on the top surface of the magnetic substrate 100. According to one embodiment, an adhesive layer (not shown) may be disposed between the coil unit 200 and the magnetic substrate 100.

The coil unit 200 may include a conductor. The conductor may include a metal or an alloy. According to one embodiment, the metal may include silver or copper, but the embodiment is not limited thereto.

The coil unit 200 may transfer the power, which is wirelessly received from the transmission side, to the connecting unit 300. The coil unit 200 can receive the power from the transmission side using the electromagnetic induction or resonance.

The connecting unit 300 may include a first connection terminal 310, a second connection terminal 320 and a printed circuit board 330.

The first connection terminal 310 of the connecting unit 300 may be connected to the first connection terminal 210 of the coil unit 200 and the second connection terminal 320 of the connecting unit 300 may be connected to the second connection terminal 220 of the coil unit 200.

The printed circuit board 330 may include a wiring layer and a receiver circuit, which will be described later, may be disposed on the wiring layer.

The connecting unit 300 connects the wireless power receiving circuit (not shown) with the coil unit 200 to transfer the power received from the coil unit 200 to a load (not shown) through the wireless power receiving circuit. The wireless power receiving circuit may include a rectifier circuit for converting AC power into DC power and a smoothing circuit for transferring the DC power to the load after removing ripple components from the DC power.

FIGS. 2 and 3 are views for explaining the structure of the wireless power receiver 1000 according to the first embodiment in detail when the coil unit 200 is connected with the connecting unit 300.

FIG. 2 is a plan view illustrating the wireless power receiver 1000 according to the first embodiment.

FIG. 2 shows the coil unit 200 connected with the connecting unit 300.

According to one embodiment, the connection between the coil unit 200 and the connecting unit 300 may be achieved by a solder. In detail, the first connection terminal 210 of the coil unit 200 may be connected to the first connection terminal 310 of the connecting unit 300 through a first solder 10 and the second connection terminal 220 of the coil unit 200 may be connected to the second connection terminal 320 of the connecting unit 300 through a second solder 20. In more detail, the first connection terminal 210 of the coil unit 200 may be connected to the first connection terminal 310 of the connecting unit 300 through a via hole of the first solder 10 and the second connection terminal 220 of the coil unit 200 may be connected to the second connection terminal 320 of the connecting unit 300 through a via hole of the second solder 20.

The wireless power receiver 1000 shown in FIG. 2 may be equipped in an electronic appliance, such as a terminal.

The terminal may include a typical mobile phone, such as a cellular phone, a PCS (personal communication service) phone, a GSM phone, a CDMA-2000 phone, or a WCDMA phone, a PMP (portable multimedia player), a PDA (personal digital assistant), a smart phone, or an MBS (mobile broadcast system) phone, but the embodiment is not limited thereto. Various devices can be used as the terminal if they can wirelessly receive the power.

A section taken along line A-A' of the connecting unit 300 shown in FIG. 2 will be explained with reference to FIG. 3.

FIG. 3 is a sectional view taken along line A-A' of the connecting unit 300 of the wireless power receiver 1000 shown in FIG. 2.

Referring to FIG. 3, the first connection terminal 210, the second connection terminal 220 and the coil 230 constituting the coil unit 200 are disposed on the top surface of the magnetic substrate 100.

In the wireless power receiver 1000 according to the first embodiment, the coil unit 200 is directly disposed on the top surface of the magnetic substrate 100, so the overall thickness can be remarkably reduced when comparing with the case in which the coil pattern is formed on an FPCB.

Preferably, the magnetic substrate 100 has a thickness of 0.43 mm and the coil unit 200 has a thickness of 0.1 mm, so the overall thickness is 0.53 mm. However, this numerical value is illustrative purpose only.

That is, the thickness of the wireless power receiver 1000 can be reduced by preparing the coil unit 200 in the form of a conductor, a conductive pattern or a thin film. Since the current trend has tended toward the slimness, if the wireless power receiver 1000 is applied to the electronic device, such as the portable terminal, the overall thickness of the portable terminal can be reduced and the power can be effectively received from the transmission side.

The connecting unit 300 is directly disposed on the coil unit 200. Since the connecting unit 300 is directly disposed on the coil unit 200, the coil unit 200 can be readily connected with the connecting unit 300.

The first connection terminal 210 of the coil unit 200 is connected to the first connection terminal 310 of the connecting unit 300 through the solder 10.

The second connection terminal 220 of the coil unit 200 is connected to the second connection terminal 320 of the connecting unit 300 through the solder 20.

The coil 230 may be designed to have a predetermined width W and a predetermined thickness T. In addition, the coil 230 can be designed to have a predetermined winding interval.

FIGS. 4 to 8 are views for explaining a method of manufacturing the wireless power receiver 1000 according to one embodiment.

The structure of the wireless power receiver 1000 may be essentially identical to the structure of the wireless power receiver 1000 described with reference to FIGS. 1 to 3.

Figure 4:
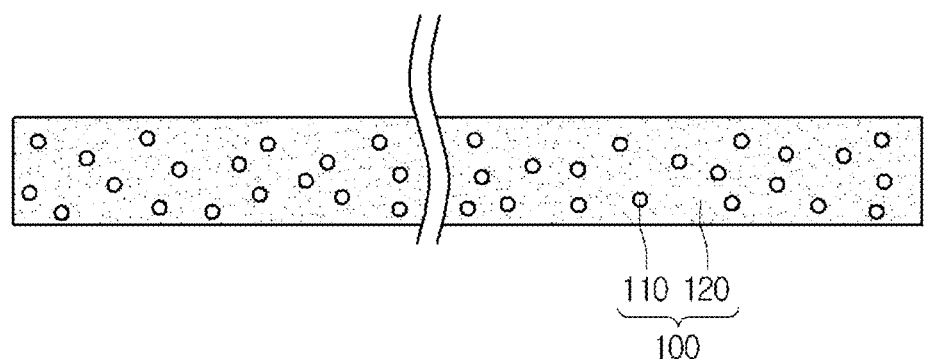
FIGS. 4 to 8 are views for explaining a method of manufacturing a wireless power receiver 1000 according to one embodiment.

First, referring to FIG. 4, the magnetic substrate 100 is prepared.

Figure 5:
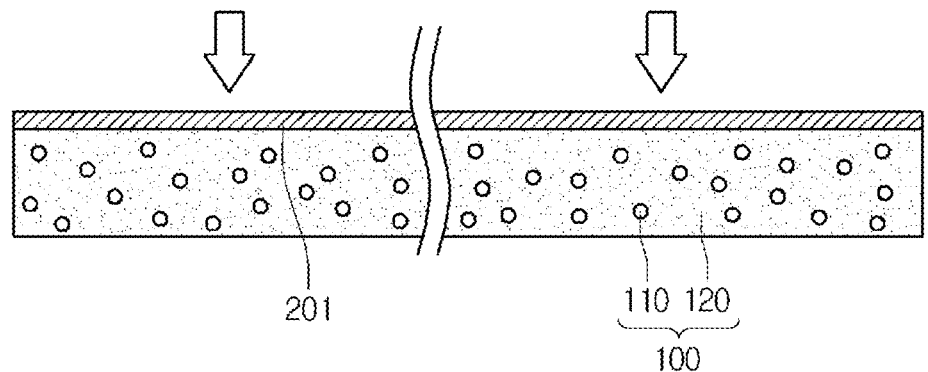

Then, referring to FIG. 5, a conductor 201 is directly laminated on the top surface of the magnetic substrate 100. According to one embodiment, the conductor 201 may be laminated after the adhesive layer has been laminated on the top surface of the magnetic substrate 100.

According to one embodiment, a laminating process can be used to form the conductor 201 on the top surface of the magnetic substrate 100. According to the laminating process, the conductor 201 is heated at the predetermined temperature and then predetermined pressure is applied to the conductor 201. The laminating process refers to a process of forming heterogeneous materials, such as a metal foil and a paper, by using heat and pressure.

Figure 6:
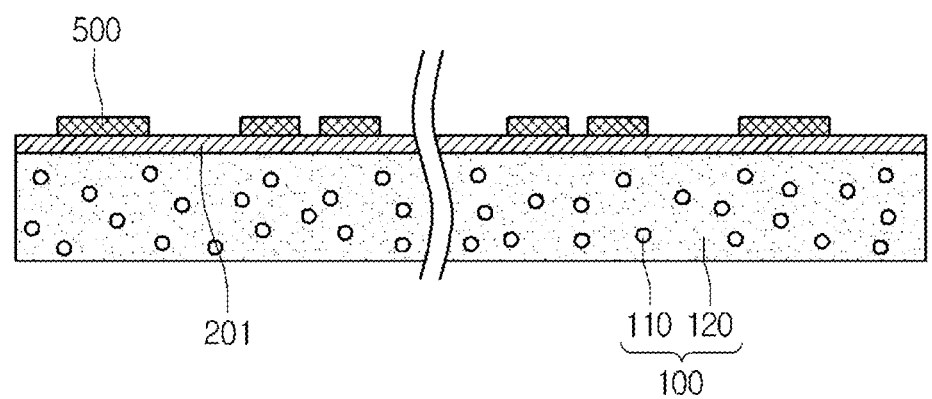

Then, referring to FIG. 6, a mask 500 is laminated on the top surface of the conductor 201. The mask 500 may be selectively formed on the top surface of the conductor 201 corresponding to positions of the first connection terminal 210, the second connection terminal 220 and the coil 230 of the coil unit 200.

Figure 7:
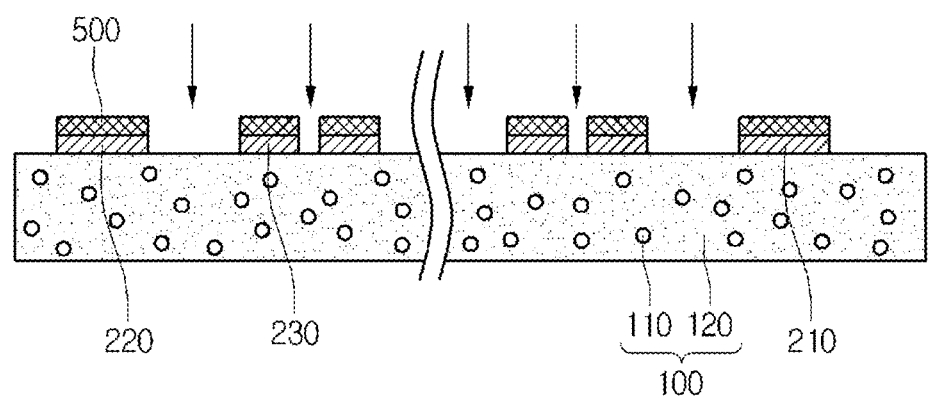

After that, referring to FIG. 7, the structure shown in FIG. 6 is immersed in an etchant so that portions of the conductor 201 where the mask 500 is not positioned may be etched. Thus, the conductor 201 may have a predetermined conductive pattern.

Then, the coil unit 200 of the wireless power receiver 1000 is formed by removing the mask 500.

Figure 8:
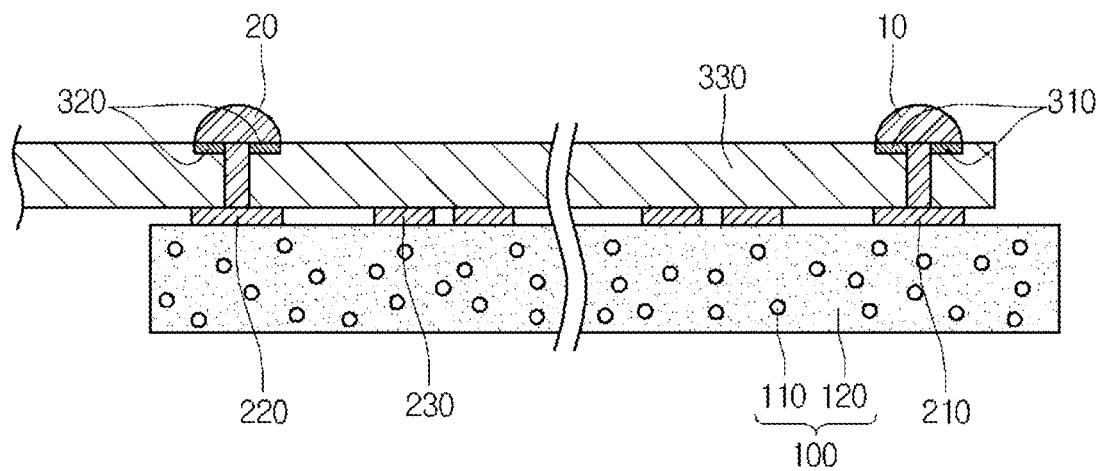

Thereafter, referring to FIG. 8, the soldering work is performed to connect the coil unit 200 with the connecting unit 300.

That is, the first connection terminal 210 of the coil unit 200 may be connected to the first connection terminal 310 of the connecting unit 300 through the first solder 10 and the second connection terminal 220 of the coil unit 200 may be connected to the second connection terminal 320 of the connecting unit 300 through the second solder 20.

Figure 9:
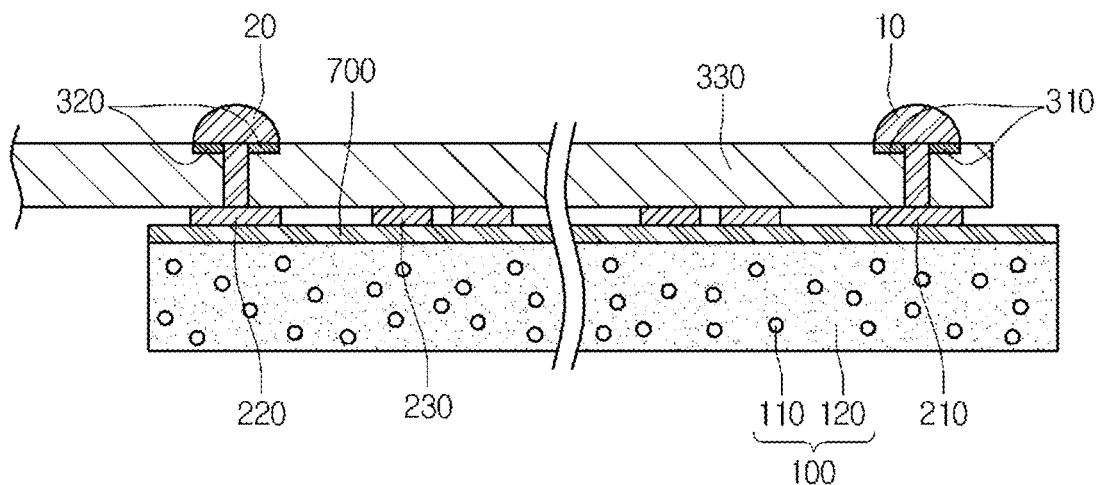
FIG. 9 is a sectional view taken along line A-A' of a connecting unit 300 of a wireless power receiver 1000 shown in FIG. 2 according to the second embodiment.

As described above, since the coil unit 200 is directly disposed on the top surface of the magnetic substrate 100, the overall thickness of the wireless power receiver 1000 can be remarkably reduced. In addition, since the wireless power receiver 1000 can be manufactured only through the laminating and etching processes, the manufacturing process may be simplified. FIG. 9 is a sectional view taken along line A-A' of the connecting unit 300 of the wireless power receiver 1000 shown in FIG. 2 according to the second embodiment.

Referring to FIG. 9, the wireless power receiver 1000 may include a magnetic substrate 100, a coil unit 200, a connecting unit 300 and an adhesive layer 700.

The magnetic substrate 100, the coil unit 200, and the connecting unit 300 are identical to those described with reference to FIG. 1.

The adhesive layer 700 is interposed between the magnetic substrate 100 and the coil unit 200 to bond the magnetic substrate 100 to the coil unit 200.

Figure 10:
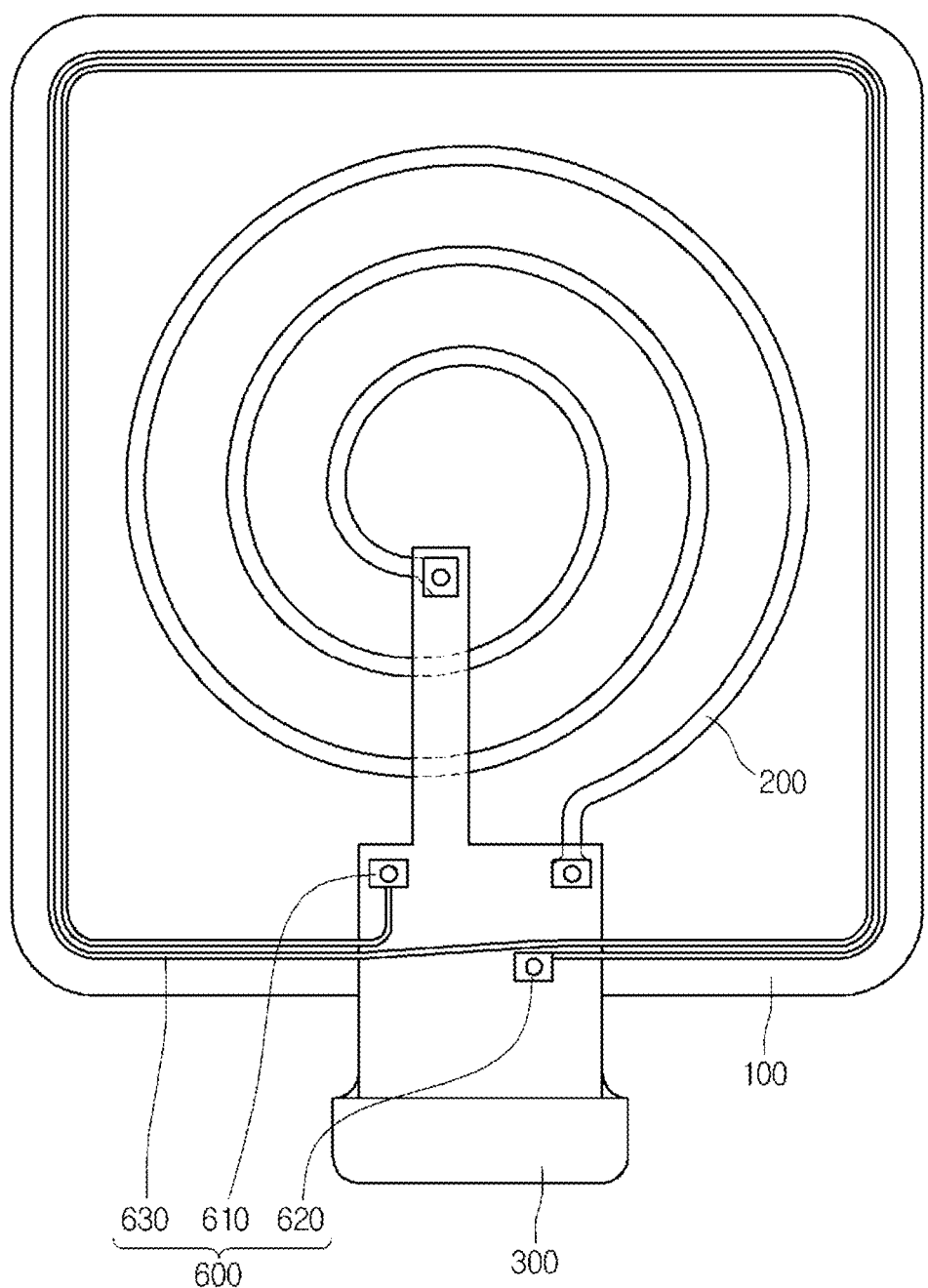
FIG. 10 is a plan view illustrating a wireless power receiver 1000 according to the third embodiment.

FIG. 10 is a plan view illustrating a wireless power receiver 1000 according to the third embodiment.

Referring to FIG. 10, the wireless power receiver 1000 may include a magnetic substrate 100, a coil unit 200, a connecting unit 300 and a short-range communication antenna 600.

The magnetic substrate 100, the coil unit 200 and the connecting unit 300 are identical to those described with reference to FIGS. 1 to 3.

The short-range communication antenna 600 includes a first connection terminal 610, a second connection terminal 620 and an outer peripheral coil 630.

The first connection terminal 610 and the second connection terminal 620 of the short-range communication antenna 600 are connected to the connecting unit 300.

The short-range communication antenna 600 can make near field communication with a reader. The short-range communication antenna 600 may serve as an antenna that transceives information in cooperation with the reader.

According to one embodiment, the short-range communication antenna 600 may be arranged at an outer peripheral portion of the coil unit 200. According to one embodiment, when the coil unit 200 is disposed at the center of the magnetic substrate 100, the short-range communication antenna 600 may be arranged along the outer peripheral portion of the magnetic substrate 100 to surround the coil unit 200. The short-range communication antenna 600 may have a rectangular configuration by winding one conductive line several times, but the embodiment is not limited thereto.

Similar to the coil unit 200, the short-range communication antenna 600 may be formed as a conductive pattern or a conductive layer.

Various short-range communication technologies can be applied to the short-range communication antenna 600, and the NFC technology is preferable. The NFC technology has the band of 12.56 MHz and is used for wireless communication in a short distance.

The short-range communication antenna 600 can be directly disposed on the top surface of the magnetic substrate 100.

The method of forming the short-range communication antenna 600 on the magnetic substrate 100 may be identical to the method described with reference to FIG. 4.

Hereinafter, a wireless power receiver 1000 according to the fourth embodiment will be described with reference to FIGS. 11 to 13.

Figure 11:
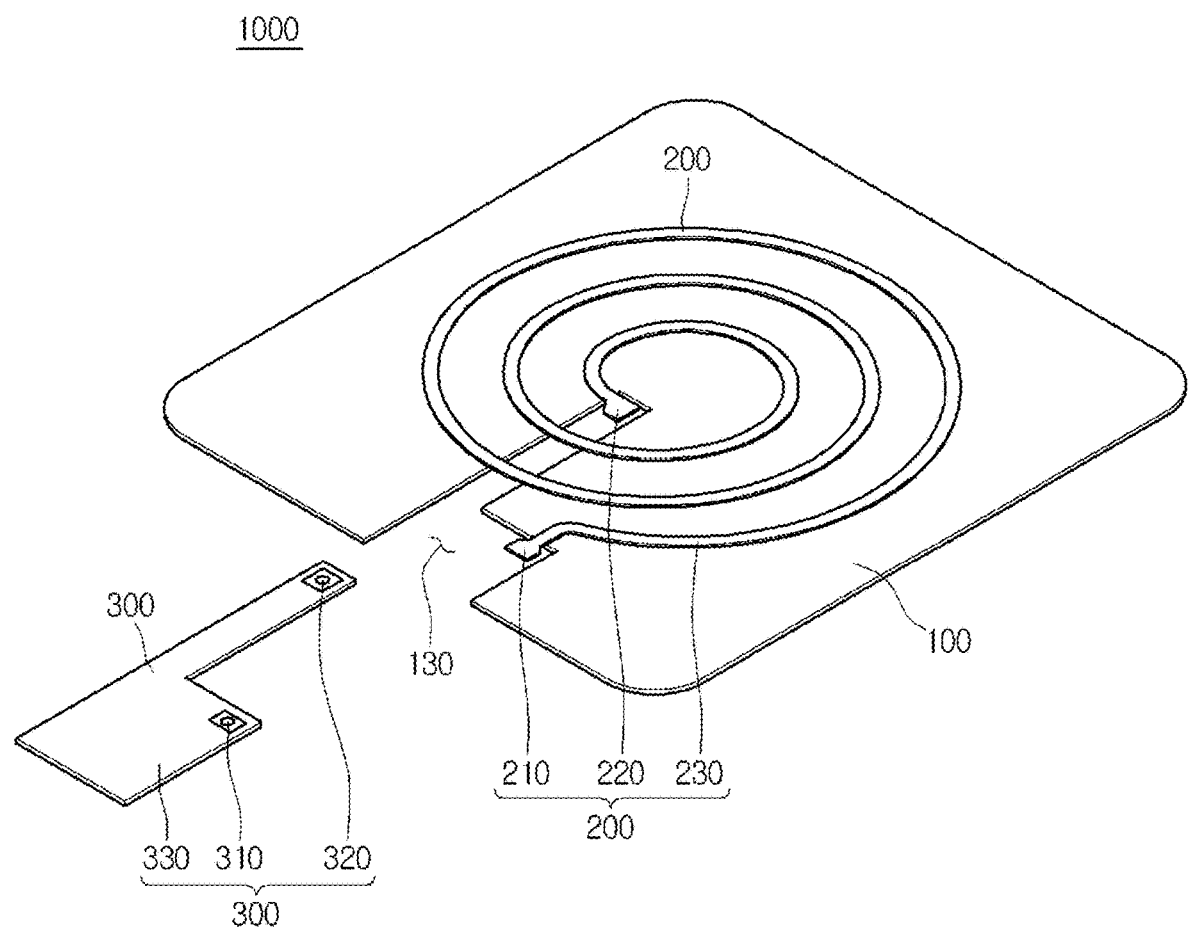
FIG. 11 is a perspective view illustrating a wireless power receiver 1000 according to the fourth embodiment.

FIG. 11 is a perspective view illustrating the wireless power receiver 1000 according to the fourth embodiment.

Referring to FIG. 11, the wireless power receiver 1000 includes a magnetic substrate 100, a coil unit 200 and a connecting unit 300.

The magnetic substrate 100 and the coil unit 200 are identical to those described with reference to FIG. 1. However, the magnetic substrate 100 is slightly different from the magnetic substrate 100 described with reference to FIG. 1, so the following description will be made while focusing the difference of the magnetic substrate 100.

Referring to FIG. 11, the magnet substrate 100 is formed with a receiving space 130 having a structure the same as that of the connecting unit 300. That is, referring to FIG. 1, the coil unit 200 is disposed on the top surface of the magnetic substrate 100 and the connecting unit 300 is disposed on the coil unit 200. However, referring to FIG. 11, the receiving space 130 having the structure the same as that of the connecting unit 300 is formed in the magnetic substrate 100, so that the connecting unit 300 may be disposed under the coil unit 200.

Figure 12:
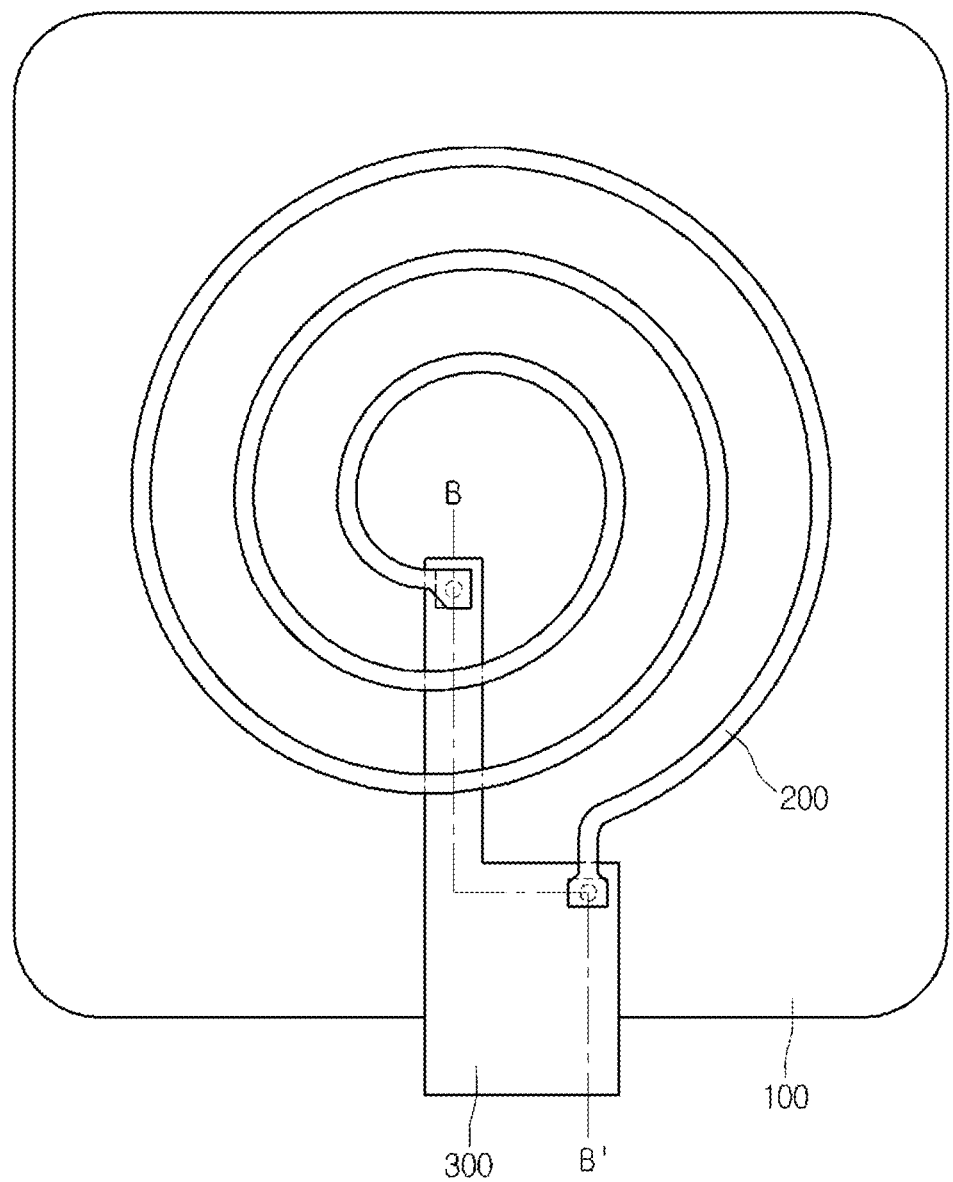
FIG. 12 is a plan view illustrating a wireless power receiver 1000 according to the fourth embodiment.

FIG. 12 is a plan view illustrating a wireless power receiver 1000 according to the fourth embodiment.

FIG. 12 shows the state in which the coil unit 200 and the connecting unit 300 are interconnected with each other.

The connecting unit 300 has a thickness equal to or smaller than a thickness of the magnetic substrate 100. The connecting unit 300 may be implemented as a flexible printed circuit board (FPCB).

The connecting unit 300 may be disposed in the receiving space 130 of the magnetic substrate 100.

If the thickness of the connecting unit 300 is equal to or smaller than the thickness of the magnetic substrate 100, different from the embodiment shown in FIG. 3, the overall thickness of the wireless power receiver 1000 can be reduced as much as the thickness of the connecting unit 300. In addition, since the usage of the magnet 110 and the support 120 can be reduced due to the receiving space 130, it is advantageous in terms of cost effectiveness.

Figure 13:
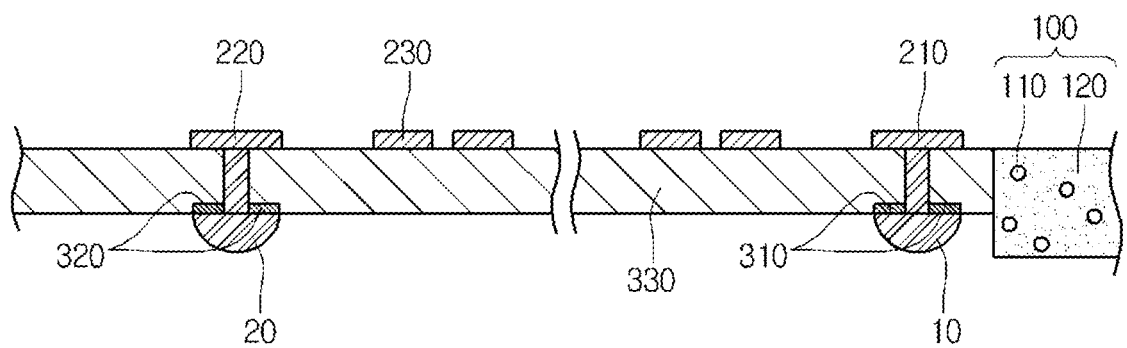
FIG. 13 is a sectional view taken along line B-B' of a connecting unit 300 of a wireless power receiver 1000 shown in FIG. 12 according to the fourth embodiment.

FIG. 13 is a sectional view taken along line B-B' of the connecting unit 300 of the wireless power receiver 1000 shown in FIG. 12 according to the fourth embodiment.

The following description will be made on the assumption that the connecting unit 300 has a thickness smaller than that of the magnetic substrate 100.

Referring to FIG. 13, the first connection terminal 210, the second connection terminal 220 and the coil 230 constituting the coil unit 200 are disposed on the top surface of the connecting unit 300.

The connecting unit 300 is disposed under the coil unit 200.

The first connection terminal 210 of the coil unit 200 is connected to the first connection terminal 310 of the connecting unit 300 by the solder 10.

The second connection terminal 220 of the coil unit 200 is connected to the second connection terminal 320 of the connecting unit 300 by the solder 20.

The coil 230 may be designed to have a predetermined width W and a predetermined thickness T. In addition, the coil 230 can be designed to have a predetermined winding interval.

Referring to FIG. 12, different from the embodiment shown in FIG. 3, the thickness of the connecting unit 300 is smaller than the thickness of the magnetic substrate 100, so the overall thickness of the wireless power receiver 1000 can be reduced as much as the thickness of the connecting unit 300. In addition, since the usage of the magnet 110 and the support 120 can be reduced due to the receiving space 130, it is advantageous in terms of cost effectiveness.

Hereinafter, a wireless power receiver 1000 according to the fifth embodiment will be described in detail with reference to FIGS. 14 to 20.

Figure 14:
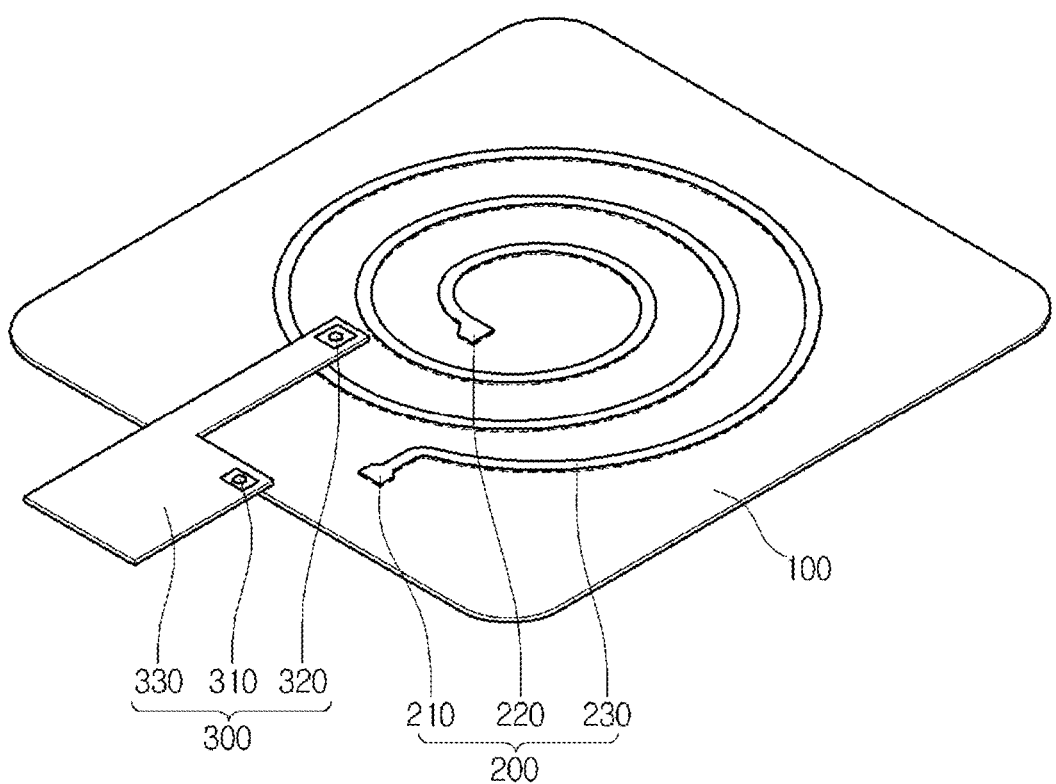
FIG. 14 is a perspective view illustrating a wireless power receiver 1000 according to the fifth embodiment.
Figure 15:
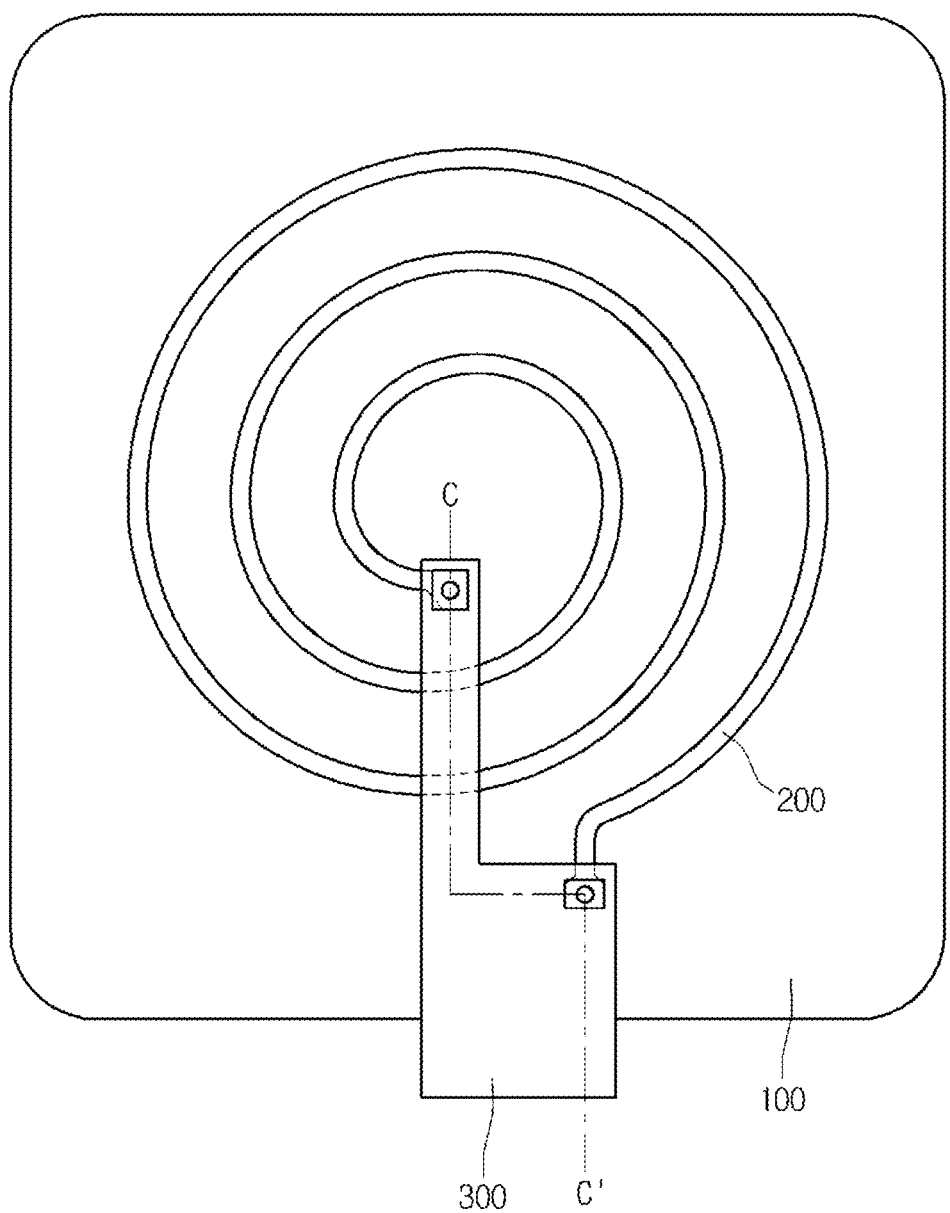
FIG. 15 is a plan view illustrating a wireless power receiver 1000 according to the fifth embodiment.
Figure 16:
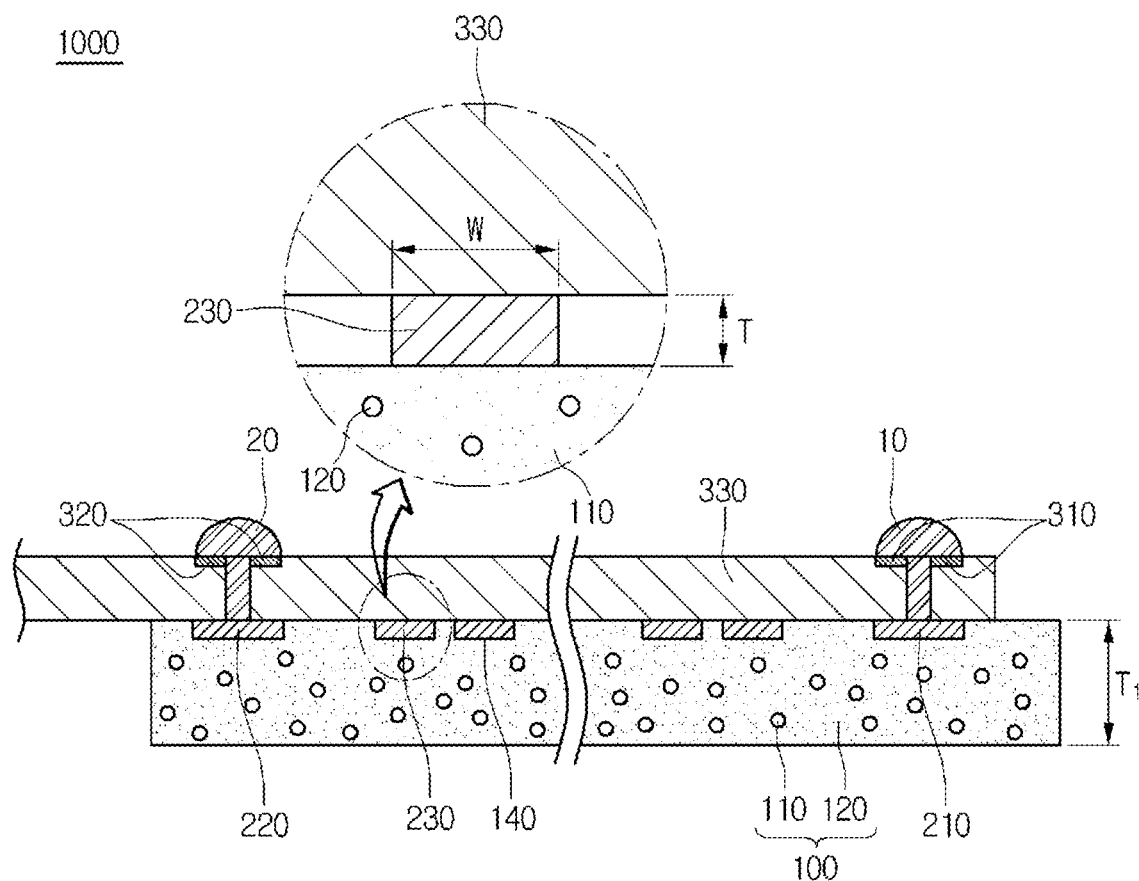
FIG. 16 is a sectional view taken along line C-C' of a wireless power receiver 1000 according to the fifth embodiment.

FIG. 14 is a perspective view illustrating the wireless power receiver 1000 according to the fifth embodiment, FIG. 15 is a plan view illustrating the wireless power receiver 1000 according to the fourth embodiment, FIG. 16 is a sectional view taken along line C-C' of the wireless power receiver 1000 according to the fifth embodiment, and FIGS. 17 to 21 are views for explaining a method of manufacturing the wireless power receiver 1000 according to the fifth embodiment.

First, referring to FIG. 14, the wireless power receiver 1000 according to the fifth embodiment may include a magnetic substrate 100, a coil unit 200 and a connecting unit 300.

According to one embodiment, the wireless power receiver 1000 can wirelessly receive power from the transmission side using electromagnetic induction. In this case, the coil 230 of the coil unit 200 can wirelessly receive power through the electromagnetic induction with a coil of the transmission side.

According to one embodiment, the wireless power receiver 1000 can wirelessly receive power from the transmission side using resonance.

The magnetic substrate 100 may change the direction of the magnetic field received from the transmission side.

The magnetic substrate 100 can reduce the amount of the magnetic field leaked to the outside by changing the direction of the magnetic field received from the transmission side.

The magnetic substrate 100 can change the direction of the magnetic field received from the transmission side in the lateral direction such that the magnetic field can be more concentrated onto the coil unit 200.

The magnetic substrate 100 can absorb some of the magnetic field received from the transmission side and leaked to the outside to dissipate the magnetic field as heat. If the amount of the magnetic field leaked to the outside is reduced, the bad influence of the magnetic field exerted on the human body can be reduced.

Referring to FIG. 16, the magnetic substrate 100 may include a magnet 110 and a support 120.

The magnet 110 may include a particle or a ceramic. According to one embodiment, the magnet 110 may be one of a spinel type magnet, a hexa type magnet, a sendust type magnet and a permalloy type magnet.

The support 120 may include thermosetting resin or thermoplastic resin and support the magnetic substrate 100.

The magnetic substrate 100 may be prepared in the form of a sheet and may have a flexible property.

Referring again to FIG. 14, the coil unit 200 may include a first connection terminal 210, a second connection terminal 220 and a coil 230. The coil 230 may formed as a conductive layer or a conductive pattern.

The coil unit 200 may be disposed inside the magnetic substrate 100. In detail, the coil unit 200 may be buried inside the magnetic substrate 100. In more detail, the magnetic substrate 100 may include a pattern groove and the coil unit 200 may be disposed in the pattern groove. The pattern groove may be formed as a conductive pattern or a conductive layer similar to the coil unit 200.

The coil unit 200 has a thickness smaller than that of the magnetic substrate 100 and an upper portion of the coil unit 200 may be exposed out of the magnetic substrate 100.

A process for manufacturing the wireless power receiver 1000 by disposing the coil unit 200 and the connecting unit 300 in the magnetic substrate 100 will be described later with reference to FIGS. 17 to 21.

The first connection terminal 210 of the coil unit 200 is located at one end of the coil 230 and the second connection terminal 220 of the coil unit 200 is located at the other end of the coil 230.

The first and second connection terminals 210 and 220 of the coil unit 200 are necessary for connection with the connecting unit 300.

The coil 230 may be formed as a coil pattern which is obtained by winding a conductive line several times. According to one embodiment, when viewed from the top, the coil pattern may have a spiral shape. However, the embodiment is not limited thereto, and various patterns may be formed.

The coil unit 200 may transfer the power wirelessly received from the transmission side to the connecting unit 300. The coil unit 200 may transfer the power wirelessly received from the transmission side using the electromagnetic induction or resonance to the connecting unit 300.

The connecting unit 300 may include a first connection terminal 310, a second connection terminal 320 and a printed circuit board 330.

The first connection terminal 310 of the connecting unit 300 may be connected to the first connection terminal 210 of the coil unit 200 and the second connection terminal 320 of the connecting unit 300 may be connected to the second connection terminal 220 of the coil unit 200.

The printed circuit board 330 may include a wiring layer and the wiring layer may include a wireless power receiving circuit, which will be described later.

The connecting unit 300 connects the wireless power receiving circuit (not shown) with the coil unit 200 to transfer the power received from the coil unit 200 to a load (not shown) through the wireless power receiver circuit. The wireless power receiver circuit may include a rectifier circuit (not shown) for converting AC power into DC power and a smoothing circuit for transferring the DC power to the load after removing ripple components from the DC power.

FIGS. 15 and 16 show the detailed structure of the wireless power receiver 1000 according to the fifth embodiment when the coil unit 200 is connected to the connecting unit 300.

FIG. 15 shows the coil unit 200 and the connecting unit 300 interconnected with each other.

The coil unit 200 can be connected to the connecting unit 300 by a solder.

Referring to FIG. 16, the first connection terminal 210 of the coil unit 200 may be connected to the first connection terminal 310 of the connecting unit 300 through a first solder 10 and the second connection terminal 220 of the coil unit 200 may be connected to the second connection terminal 320 of the connecting unit 300 through a second solder 20. In detail, the first connection terminal 210 of the coil unit 200 may be connected to the first connection terminal 310 of the connecting unit 300 through a via hole of the first solder 10 and the second connection terminal 220 of the coil unit 200 may be connected to the second connection terminal 320 of the connecting unit 300 through a via hole of the second solder 20.

According to one embodiment, the via hole can be formed by using a laser. The laser may include a UV laser or a CO2 laser.

FIG. 16 is a sectional view of the wireless power receiver 1000 in which the magnetic substrate 100 and the coil unit 200 are connected to the connecting unit 300.

That is, the first connection terminal 210, the second connection terminal 220 and the coil 230 constituting the coil unit 200 may be disposed in a pattern groove 140 of the magnetic substrate 100.

In addition, the magnetic substrate 100 and the coil unit 200 are connected to the connecting unit 300.

The coil 230 may be designed to have a predetermined width W and a predetermined thickness T and the magnetic substrate 100 may be designed to have a predetermined thickness T1. According to one embodiment, the coil 230 has a thickness of 0.1 mm and the magnetic substrate 100 has a thickness of 0.43 mm, but these numerical values are illustrative purposes only. According to one embodiment, the thickness T of the coil 230 may be smaller than the thickness T1 of the magnetic substrate 100.

In the wireless power receiver 1000 according to the fifth embodiment, the coil unit 200 is directly disposed in the pattern groove 140 of the magnetic substrate 100, so the overall thickness of an electronic appliance equipped with the wireless power receiver 1000 can be reduced as much as the thickness of the coil unit 200. Thus, if the wireless power receiver 1000 according to the fifth embodiment is applied to the electronic device, such as the portable terminal, the overall thickness of the portable terminal can be reduced suitably for the current trend of slimness In addition, in the wireless power receiver 1000 according to the fifth embodiment, the coil unit 200 is disposed in the pattern groove 140 of the magnetic substrate 100. Thus, different from the electronic appliance in which a coil pattern is formed on an FPCB, the overall size of the electronic device equipped with the wireless power receiver 1000 can be reduced.

FIGS. 17 to 21 are views for explaining a method of manufacturing the wireless power receiver 1000 according to the fifth embodiment.

Hereinafter, the method of manufacturing the wireless power receiver 1000 according to the fifth embodiment will be described with reference to FIGS. 17 to 21 as well as FIGS. 14 to 16.

Figure 17:
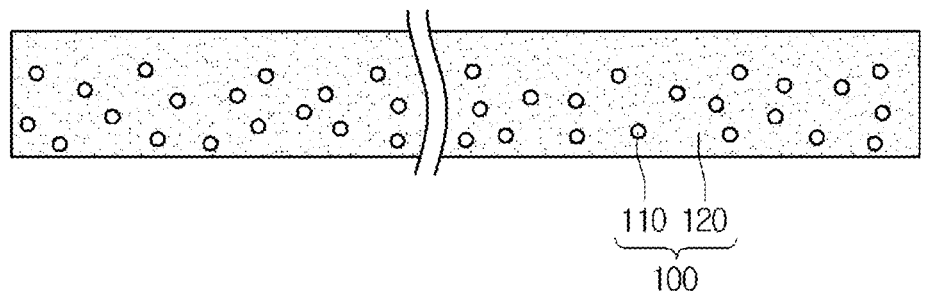
FIGS. 17 to 21 are views for explaining a method of manufacturing a wireless power receiver 1000 according to the fifth embodiment.

First, referring to FIG. 17, the magnetic substrate 100 is prepared. According to one embodiment, the magnetic substrate 100 may be produced by coating metal powder of sendust alloys, such as Al, Fe and SiO2, on polyethylene rubber and then forming an oxide layer on a surface of the polyethylene rubber.

Figure 18:
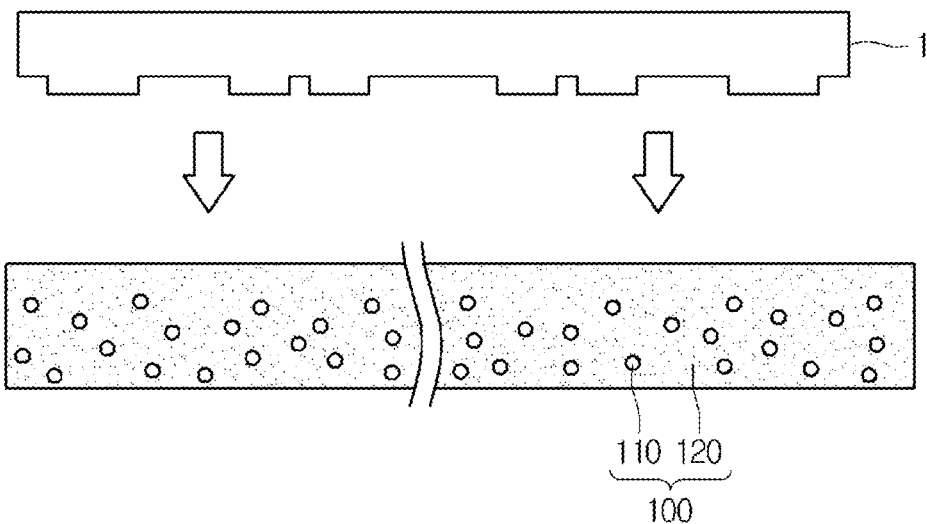

Then, referring to FIG. 18, heat and pressure are applied using a mold 1 to form the pattern groove in the magnetic substrate 100 for receiving the coil unit 200. The mold 1 may have the shape corresponding to the shape of the coil unit 200. According to one embodiment, the mold 1 can be manufactured by using an aluminum alloy, a copper alloy or a cast iron.

The mold 1 may be provided with a protrusion at a region corresponding to the coil unit 200 for wirelessly receiving the power.

When the heat is applied by using the mold 1, the heat having the specific temperature is applied by taking the property of the metal powder of the sendust alloy constituting the magnetic substrate 100 into consideration. According to one embodiment, if the magnetic substrate 100 is produced by coating the metal powder of sendust alloy on the polyethylene rubber, when the heat and pressure are applied by using the mold 1, high-pressure is applied at the temperature in the range of 100° C. to 180° C., and then the mold 100 is cooled to the temperature of 100° C. or below. After that, the mold 1 is separated from the magnetic substrate 100. If the mold 1 is separated just after the pressure has been applied to the magnetic substrate 100, the desired pattern groove 140 may not be formed due to residual heat in the pattern groove 140. For this reason, the mold 1 is separated from the magnetic substrate 100 after cooling the mold 100 to the temperature of 100° C. or below.

If the magnetic substrate 100 is prepared by using the metal powder of sendust alloy, the heat temperature and pressure may vary depending on the distribution and concentration of the metal powder. That is, if the distribution of the metal powder is not uniform, the higher temperature and pressure may be applied. In contrast, if the distribution of the metal powder is uniform, the lower temperature and pressure may be applied. In addition, if the concentration of the metal powder is low, the lower temperature and pressure may be applied as compared with the case in which the concentration of the metal powder is high. Further, the heat temperature and pressure may vary depending on the composition of the metal powder, that is, depending on the alloy constituting the metal powder.

In this manner, the temperature applied to the mold 1 may vary depending on the distribution, concentration and composition of the powder.

According to one embodiment, laser may be irradiated, instead of applying heat and pressure using the mold 1, to form the pattern groove in the magnetic substrate 100 to receive the coil unit 200. In this case, the pattern groove can be formed by using an excimer laser that irradiates the laser beam having a wavelength band of ultraviolet ray. The excimer laser may include a KrF excimer laser (central wavelength 248 nm) or an ArF excimer laser (central wavelength 193 nm).

Figure 19:
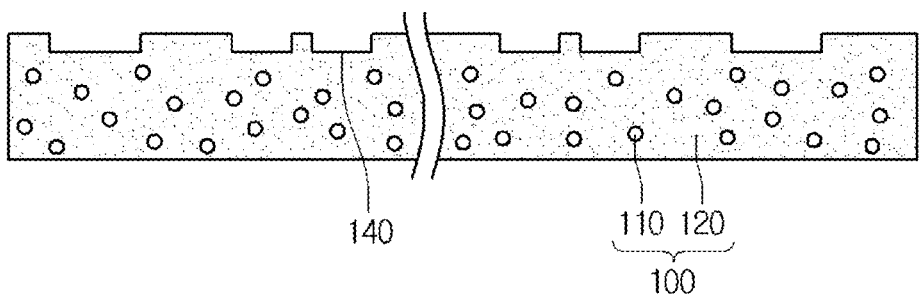

Next, referring to FIG. 19, the mold 1 is separated from the magnetic substrate 100 so that the magnetic substrate 100 is formed with the pattern groove 140.

Figure 20:
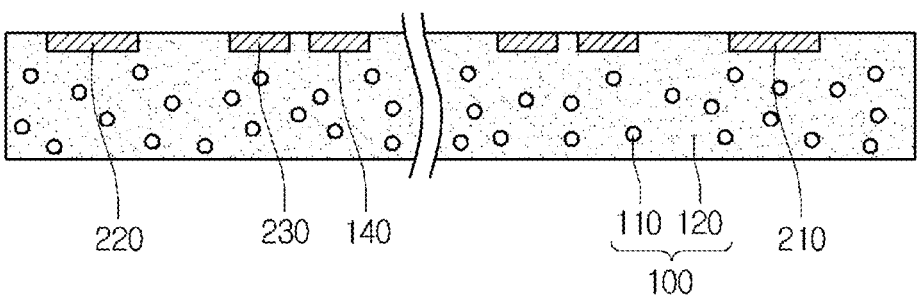

Then, referring to FIG. 20, the coil unit 200 is inserted into the pattern groove 140 formed in the magnetic substrate 100. As the coil unit 200 is inserted into the pattern groove 140, a predetermined conductive pattern is formed in the pattern groove 140 of the magnetic substrate 100.

According to one embodiment, a process for forming the coil unit 200 in the pattern groove 140 of the magnetic substrate 100 may include a plating process or a process for inserting a metal which has been etched to have the conductive pattern formed by the coil unit 200.

In detail, according to the plating process, the metallic material is filled in the pattern groove 140 to form the coil unit 200. At this time, the metallic material may include one selected from Cu, Ag, Sn, Au, Ni and Pd and the filling of the metallic metal can be performed through one of electroless plating, screen printing, sputtering, evaporation, inkjetting and dispensing or a combination thereof.

Figure 21:
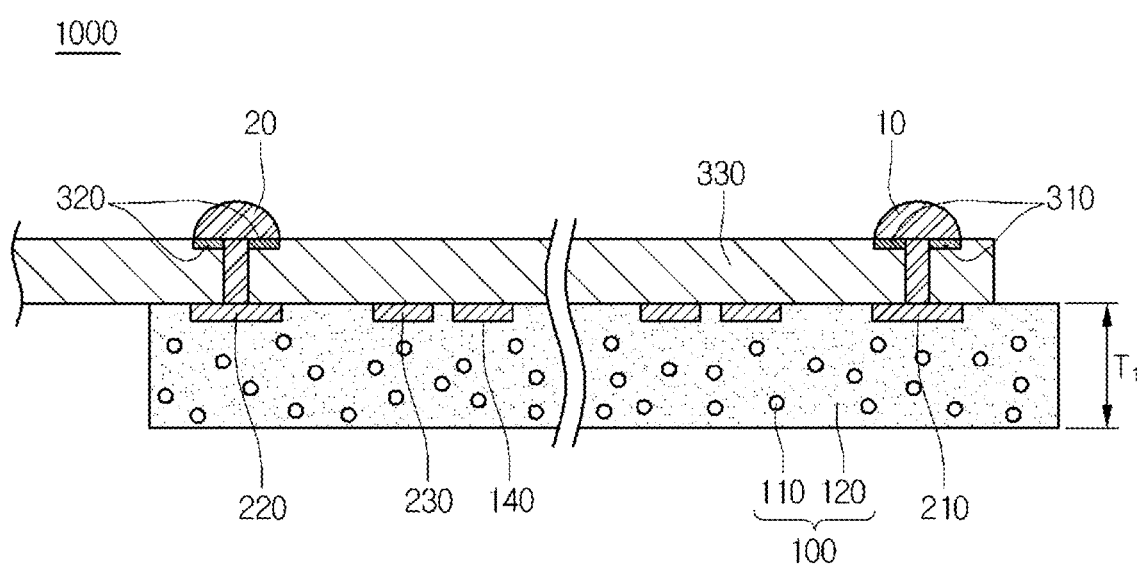

Then, referring to FIG. 21, the soldering process is performed to connect the coil unit 200 with the connecting unit 300.

That is, the first connection terminal 210 of the coil unit 200 is connected to the first connection terminal 310 of the connecting unit 300 through the solder 10 and the second connection terminal 220 of the coil unit 200 is connected to the second connection terminal 320 of the connecting unit 300 through the solder 20.

As described above, according to the method of manufacturing the wireless power receiver 1000 of the fifth embodiment, the pattern groove is formed in the magnetic substrate 100 and the coil unit 200 is disposed in the pattern groove, so that the overall thickness of the wireless power receiver 1000 can be reduced. In addition, the wireless power receiver 1000 can be manufactured by simply forming the pattern groove and then inserting the coil unit into the pattern groove, so that the manufacturing process can be simplified.

FIG. 22 is a view for explaining variation of inductance, resistance and Q values of the coil unit 200 as a function of a usable frequency when the coil unit 200 is disposed on a top surface of the magnetic substrate according to the first embodiment, and FIG. 23 is a view for explaining variation of inductance, resistance and Q values of the coil unit 200 as a function of a usable frequency when the coil unit 200 is disposed in the pattern groove formed in the magnetic substrate according to the fifth embodiment.

The inductance, resistance and Q values of the coil unit 200 can be expressed as following equation 1.

$$Q = W * L/R \qquad \text{[Equation 1]}$$

In equation 1, w is a frequency used when transmitting power, L is inductance of the coil unit 200 and R is resistance of the coil unit 200.

As can be understood from equation 1, the Q value becomes high as the inductance of the coil unit 200 is increased. If the Q value is increased, the power transmission efficiency can be improved. The resistance of the coil unit 200 is a numerical value of power loss occurring in the coil unit 200 and the Q value becomes high as the resistance value is decreased.

Referring to FIGS. 22 and 23, when comparing the fifth embodiment, in which the coil unit 200 is disposed in the pattern groove 140 of the magnetic substrate 100, with the first embodiment, in which the coil unit 200 is disposed on the top surface of the magnetic substrate 100, when the usable frequency is 150 kHz, the inductance of the coil unit 200 is increased by 352.42 um from about 9986.92 um to about 10339.34 um and the resistance of the coil unit 200 is reduced by 0.057Ω from 0.910Ω to 0.853Ω. That is, the Q value is increased corresponding to the increment of the inductance and the reduction of the resistance.

Therefore, the wireless power receiver 1000 according to the fifth embodiment can increase the Q value by disposing the coil unit 200 in the pattern groove of the magnetic substrate 100.

Figure 24:
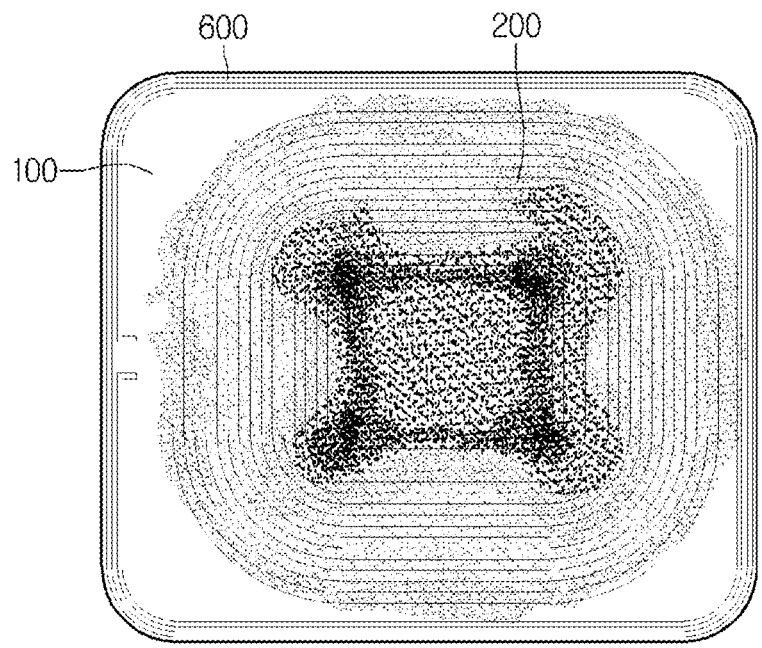
FIG. 24 is an H-field for illustrating a radiation pattern of a magnetic field when a coil unit is disposed on a top surface of a magnetic substrate according to the first embodiment.
Figure 25:
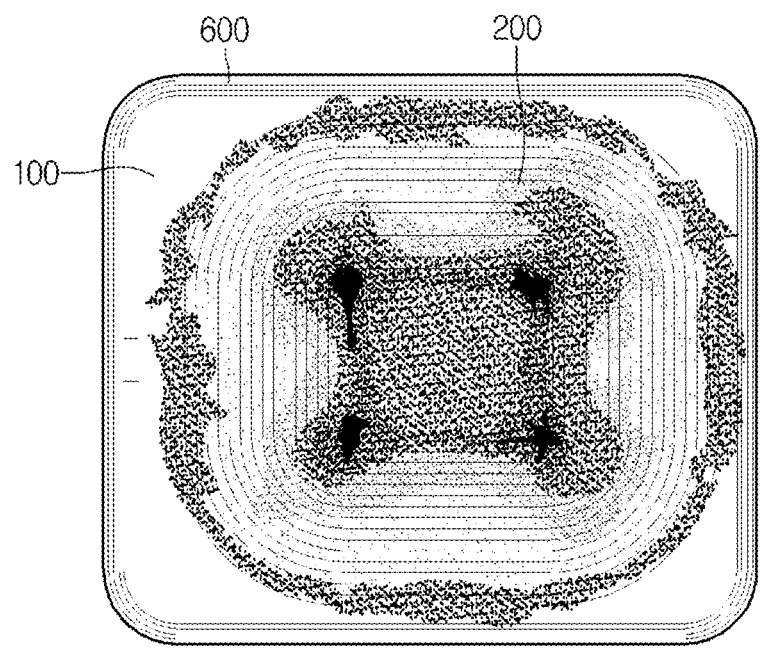
FIG. 25 is an H-field for illustrating a radiation pattern of a magnetic field when a coil unit is disposed in a pattern groove formed in a magnetic substrate according to the fifth embodiment.

FIG. 24 is an H-field for illustrating a radiation pattern of a magnetic field when the coil unit is disposed on a top surface of the magnetic substrate according to the first embodiment, and FIG. 25 is an H-field for illustrating a radiation pattern of a magnetic field when the coil unit is disposed in the pattern groove formed in the magnetic substrate according to the fifth embodiment.

Referring to FIGS. 24 and 25, a greater amount of magnetic fields is radiated from the outer peripheral portion of the coil unit 200 when the coil unit 200 is disposed in the pattern groove formed in the magnetic substrate 100 as compared with the case in which the coil unit 200 is disposed on the top surface of the magnetic substrate 100. This is because the magnetic field directed to the outside is changed in the lateral direction of the coil unit 200 due to the coil unit 200 buried in the magnetic substrate 100.

In addition, a greater amount of magnetic fields is radiated at the inner portion of the coil unit 200 when the coil unit 200 is disposed in the pattern groove formed in the magnetic substrate 100 as compared with the case in which the coil unit 200 is disposed on the top surface of the magnetic substrate 100. This is also because the magnetic field directed to the outside is changed in the lateral direction of the coil unit 200 due to the coil unit 200 buried in the magnetic substrate 100.

Referring to FIGS. 24 and 25, the wireless power receiver 1000 may further include a short-range communication antenna 600.

The short-range communication antenna 600 can make near field communication with a reader. The short-range communication antenna 600 may serve as an antenna that transceives information in cooperation with the reader.

According to one embodiment, the short-range communication antenna 600 may be arranged at an outer peripheral portion of the coil unit 200. According to one embodiment, when the coil unit 200 is disposed at the center of the magnetic substrate 100, the short-range communication antenna 600 may be arranged along the outer peripheral portion of the magnetic substrate 100 to surround the coil unit 200. The short-range communication antenna 600 may have a rectangular configuration by winding one conductive line several times, but the embodiment is not limited thereto.

Similar to the coil unit 200, the short-range communication antenna 600 may be formed as a conductive pattern or a conductive layer.

Various short-range communication technologies can be applied to the short-range communication antenna 600 and the NFC technology is preferable.

Hereinafter, a wireless power receiver according to another embodiment will be described with reference to FIGS. 26 to 37.

Figure 26:
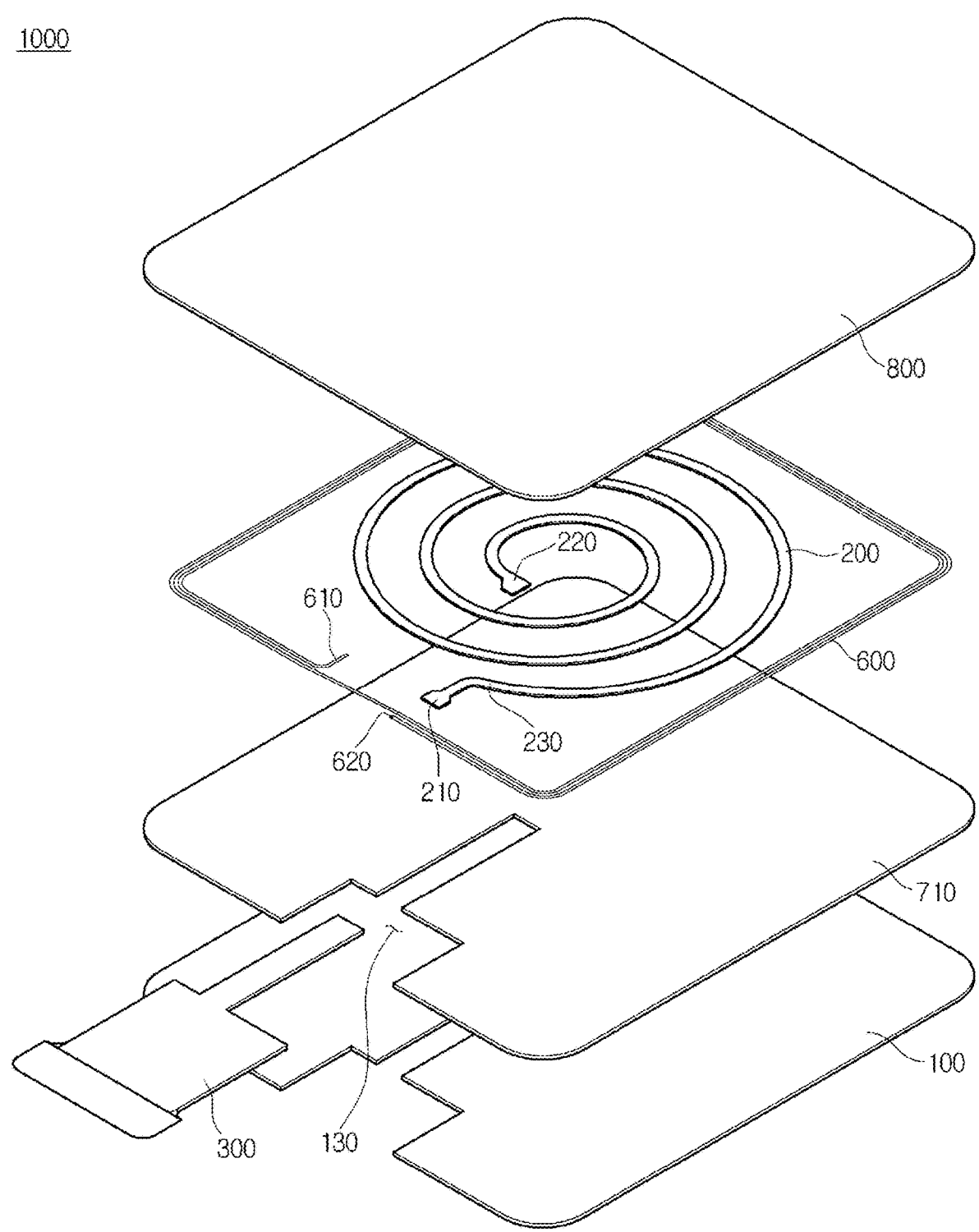
FIG. 26 is an exploded perspective view of a wireless power receiver 1000 according to still another embodiment.
Figure 27:
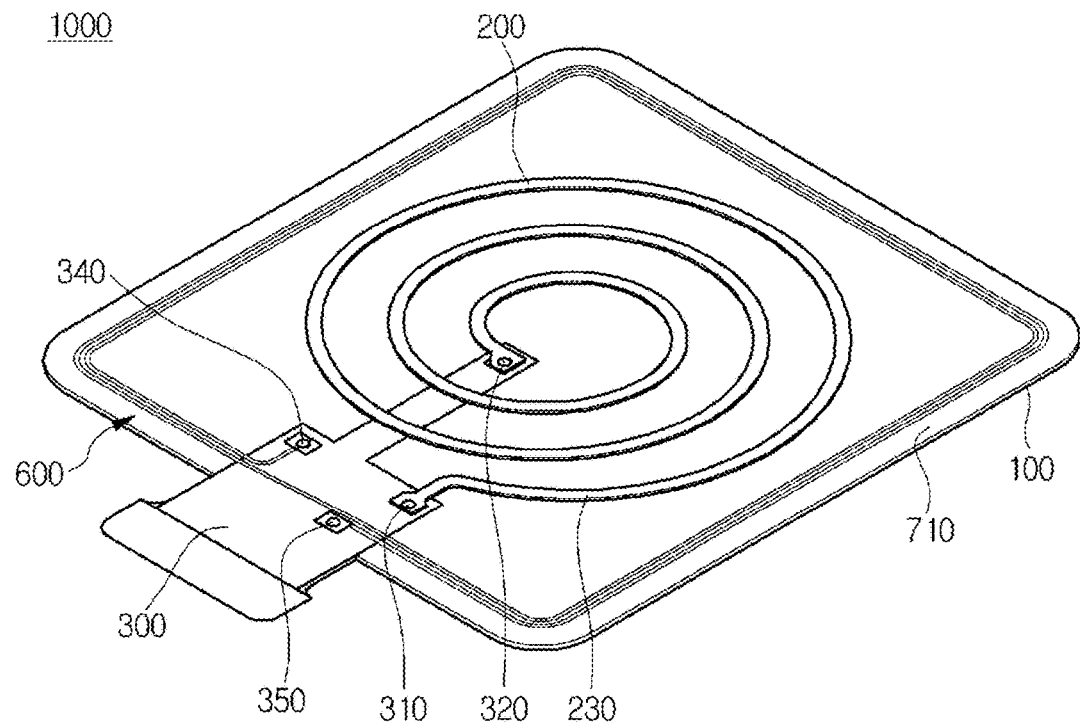
FIG. 27 is a perspective view of a wireless power receiver 1000 according to still another embodiment.
Figure 28:
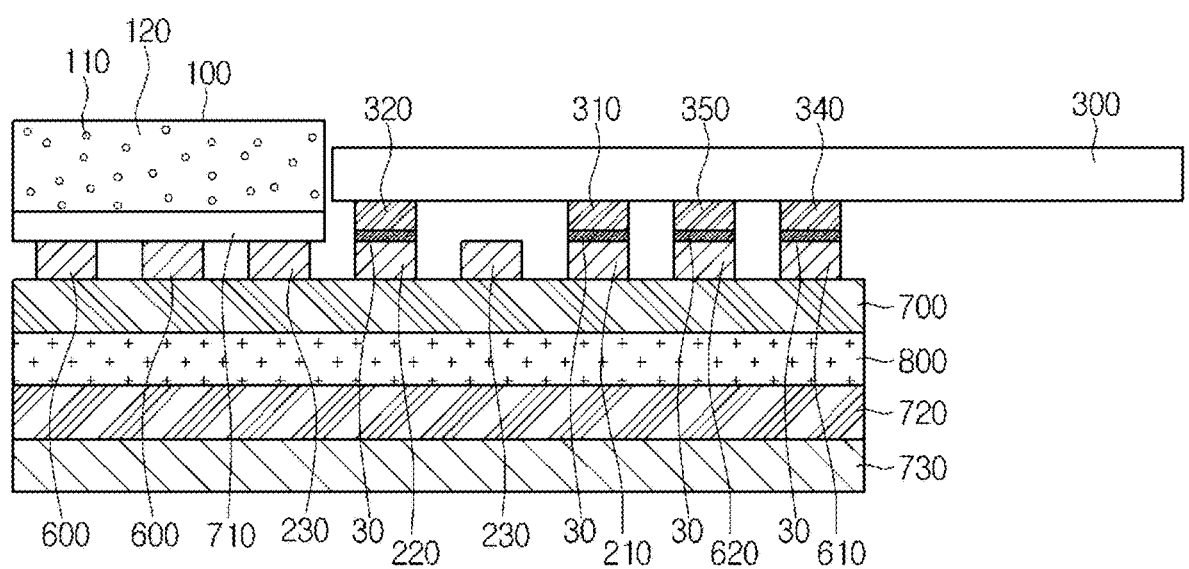
FIG. 28 is a sectional view of a wireless power receiver 1000 according to still another embodiment.

FIG. 26 is an exploded perspective view of the wireless power receiver 1000 according to still another embodiment, FIG. 27 is a perspective view of the wireless power receiver 1000 according to still another embodiment, and FIG. 28 is a sectional view of the wireless power receiver 1000 according to still another embodiment.

Meanwhile, FIG. 27 is a perspective view showing the assembled state of the elements of the wireless power receiver 1000 shown in FIG. 26, in which some elements are omitted.

The wireless power receiver 1000 according to still another embodiment may be disposed in an electronic device, such as a portable terminal.

Referring to FIGS. 26 to 28, the wireless power receiver 1000 may include a magnetic substrate 100, a coil unit 200, a connecting unit 300, a short-range communication antenna 600, an adhesive layer 700, a first dual-side adhesive layer 710, a second dual-side adhesive layer 720, a protective film 800 and a release paper layer 730.

Referring to FIG. 26, the magnetic substrate 100 can change the direction of the magnetic field transferred from the transmission side.

The magnetic substrate 100 changes the direction of the magnetic field transferred to the coil unit 200 from the transmission side to reduce the amount of the magnetic field leaked to the outside. Thus, the magnetic substrate 100 may have the electromagnetic wave shielding effect.

In detail, the magnetic substrate 100 changes the direction of the magnetic field transferred from the transmission side in the lateral direction such that the magnetic field can be more concentrated onto the coil unit 200.

The magnetic substrate 100 can absorb some of the magnetic field transferred to the coil unit 200 from the transmission side and leaked to the outside to dissipate the magnetic field as heat. If the amount of the magnetic field leaked to the outside is reduced, the bad influence of the magnetic field exerted on the human body can be reduced.

Referring to FIG. 28, the magnetic substrate 100 may include a magnet 110 and a support 120.

According to one embodiment, the magnet 110 may be one of a spinel type magnet, a hexa type magnet, a sendust type magnet and a permalloy type magnet.

The support 120 may include thermosetting resin or thermoplastic resin and support the magnetic substrate 100.

Referring again to FIG. 26, the magnetic substrate 100 may be prepared in the form of a sheet and may have a flexible property.

A receiving space 130 is formed at a predetermined area of the magnet substrate 100. The receiving space 130 has a structure the same as that of the connecting unit 300. The connecting unit 300 is disposed in the receiving space 130 and connected to the coil unit 200.

The coil unit 200 can receive the power from the transmission side using the electromagnetic induction or resonance. Similar to the coil unit 200 illustrated in FIG. 1, the coil unit 200 may include a first connection terminal 210, a second connection terminal 220 and a coil 230. The coil 230 may be formed as a conductive layer or a conductive pattern.

The connecting unit 300 connects a receiver circuit (not shown) with the coil unit 200 to transfer the power received from the coil unit 200 to a load (not shown) through the receiver circuit.

The connecting unit 300 may include a wiring layer and the wiring layer may include the wireless power receiving circuit. The wireless power receiving circuit may include a rectifier circuit for rectifying the power received from the coil unit 200, a smoothing circuit for removing noise signals, and a main IC chip for performing the operation to wirelessly receive the power.

In addition, the receiver circuit can transfer the signal received from the short-range communication antenna 600 to a short-range communication signal processing unit (not shown).

The connecting unit 300 is disposed in the receiving space 130 of the magnetic substrate 100 and connected to the coil unit 200. FIG. 27 shows the connecting unit 300 disposed in the receiving space 130 of the magnetic substrate 100.

The connecting unit 300 may include a first connection terminal 310, a second connection terminal 320, a third connection terminal 340 and a fourth connection terminal 350. The first connection terminal 310 of the connecting unit 300 is connected to the first connection terminal 210 of the coil unit 200, the second connection terminal 320 of the connecting unit 300 is connected to the second connection terminal 220 of the coil unit 200, the third connection terminal 340 of the connecting unit 300 is connected to a first connection terminal 610 of the short-range communication antenna 600 and the fourth connection terminal 350 of the connecting unit 300 is connected to a second connection terminal 620 of the short-range communication antenna 600.

The connecting unit 300 may have the shape corresponding to the shape of the receiving space 130 and may be disposed in the receiving space 130. Since the connecting unit 300 is disposed in the receiving space 130 of the magnetic substrate 100, the thickness of the wireless power receiver 1000 can be remarkably reduced as much as the thickness of the connecting unit 300. Thus, the thickness of the electronic device, such as a portable terminal, equipped with the wireless power receiver 1000 can be remarkably reduced.

According to one embodiment, the connecting unit 300 may include a flexible printed circuit board (FPCB), a tape substrate (TS) or a lead frame (LF). If the tape substrate is used as the connecting unit 300, the thickness of the connecting unit 300 can be reduced, so that the overall size of the wireless power receiver 1000 can be reduced.

If the lead frame is used as the connecting unit 300, the wiring layer included in the connecting unit 300 can be protected from the heat, external moisture or impact and the mass production can be realized.

Referring again to FIG. 26, the short-range communication antenna 600 can make near field communication with a reader. The short-range communication antenna 600 may serve as an antenna that transceives information in cooperation with the reader.

According to one embodiment, the NFC signal processing unit (not shown) can process the signal transferred to the short-range communication antenna 600 through the connecting unit 300.

Various short-range communication technologies can be applied to the short-range communication antenna 600 and the NFC technology is preferable.

According to one embodiment, the short-range communication antenna 600 may be arranged at an outer peripheral portion of the coil unit 200. Referring to FIG. 27, when the coil unit 200 is disposed at the magnetic substrate 100, the short-range communication antenna 600 may be arranged along the outer peripheral portion of the magnetic substrate 100 to surround the coil unit 200. The short-range communication antenna 600 may have a rectangular configuration by winding one conductive line several times, but the embodiment is not limited thereto.

Referring again to FIG. 26, the adhesive layer (not shown) may be disposed under the protective film 800 to form the protective film 800 on the coil unit 200 and the short-range communication antenna 600, which will be described later in detail.

The first dual-side adhesive layer 710 is interposed between the magnetic substrate 100 and the coil unit 200/short-range communication antenna 600 to adhere the coil unit 200 to the magnetic substrate 100, which will be described later in detail. Similar to the magnetic substrate 100, a receiving space having the shape identical to the shape of the connecting unit 300 may be formed in the first dual-side adhesive layer 710.

Referring again to FIG. 28, the second dual-side adhesive layer 720 adheres the protective film 800 to the release paper layer 730, which will be described later in detail.

The coil unit 200 may be disposed on the magnetic substrate 100 and may have a spiral structure, but the embodiment is not limited thereto.

Hereinafter, the method of manufacturing the wireless power receiver 1000 according to still another embodiment will be described with reference to FIGS. 29 to 37.

Figure 29:
FIGS. 29 to 37 are views for explaining a method of manufacturing a wireless power receiver according to still another embodiment.

When the manufacturing process starts, as shown in FIG. 29, the conductor 201, the adhesive layer 700 and the protective film 800 are prepared.

According to one embodiment, the conductor 201 may be formed by using an alloy including copper. The copper is in the form of roll annealed copper or electrodeposited copper. The conductor 201 may have various thicknesses depending on the specification of a product. According to one embodiment, the conductor 201 may have the thickness of 100 μm, but the embodiment is not limited thereto.

The adhesive layer 700 is used to reinforce the adhesive strength between the conductor 201 and the protective film 800. The adhesive layer 700 may include thermosetting resin, but the embodiment is not limited thereto. The adhesive layer may have the thickness of 17 μm, but the embodiment is not limited thereto.

The protective film 800 protects the conductor 201 when a predetermined conductive pattern is formed in the conductor 201. In detail, the protective film 800 supports the conductor 201 in the etching process, which will be described later, to protect the conductor 201 such that the predetermined conductive pattern can be formed in the conductor 201.

According to one embodiment, the protective film 800 may include polyimide film (PI film), but the embodiment is not limited thereto.

Figure 30:
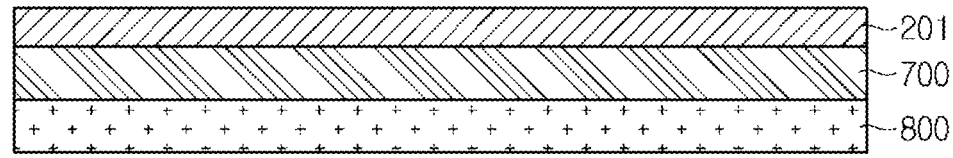

Then, as shown in FIG. 30, the conductor 201 is formed on the protective film 800 by the adhesive layer 700. The laminating process can be used to form the conductor 201 on the protective film 800. The laminating process refers to the process to bond heterogeneous materials with each other by applying predetermined heat and pressure.

Figure 31:
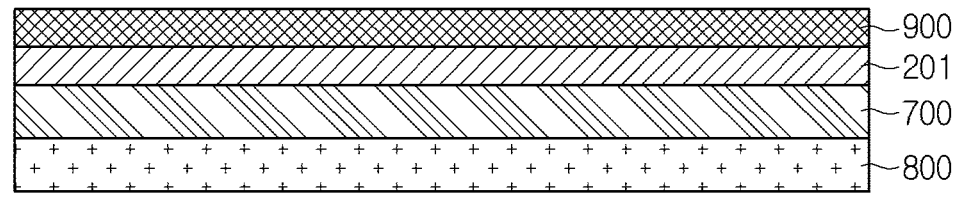

Then, as shown in FIG. 31, a photoresist film 900 is attached onto the top surface of the conductor 201. The photoresist film 900 is used for etching the conductor 201 to form a predetermined conductive pattern in the conductor 201. A UV exposure type film or an LDI exposure type film may be used as the photoresist film 900. According to another embodiment, a photoresist coating solution can be coated on the top surface of the conductor 201 without using the photoresist film 900.

Figure 32:
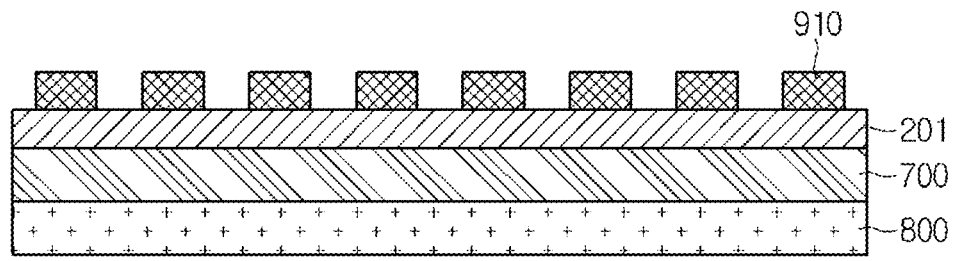

After that, as shown in FIG. 32, the photoresist film 900 is subject to the exposure and development processes to form a mask pattern 910.

The mask pattern 910 may be formed on the top surface of the conductor 201 corresponding to the position of the conductive pattern.

The exposure process refers to the process for selectively irradiating light onto the photoresist film 900 corresponding to the conductive pattern. In detail, in the exposure process, the light is irradiated onto regions of the conductor 201 where the conductive pattern is not formed. The development process refers to the process for removing the regions to which the light is irradiated through the exposure process.

Due to the exposure and development processes, the mask pattern 910 may be formed in the regions corresponding to the coil unit 200 and the short-range communication antenna 600. The conductor 201 exposed through the mask pattern 910 may be etched.

Figure 33:
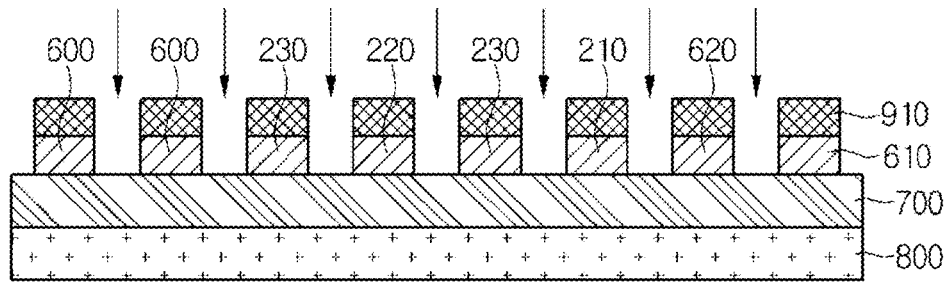

Then, as shown in FIG. 33, a predetermined portion of the conductor 201 where the mask pattern 910 is not formed may be removed through the etching process. The etching process refers to the process of removing the predetermined portion of the conductor 201 where the mask pattern 910 is not formed by using a chemical reacting with the predetermined portion of the conductor 201. According to one embodiment, the conductor 201 may be patterned through the wet etching or dry etching.

Figure 34:
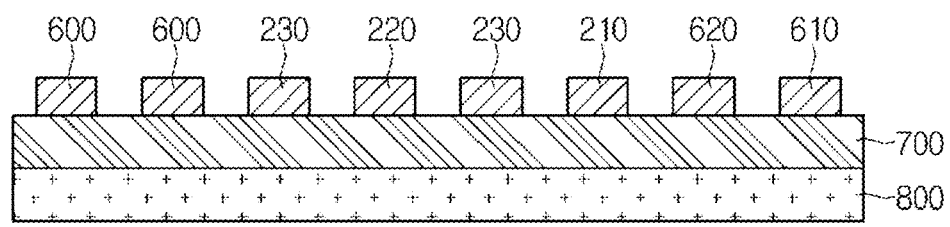

After that, as shown in FIG. 34, the mask pattern 910 is removed so that the first and second connection terminals 210 and 220 of the coil unit 200, the first and second connection terminals 610 and 620 of the short-range communication antenna 600, the coil 230 having a predetermined conductive pattern and the short-range communication antenna 600 having a predetermined conductive pattern may be formed.

Figure 35:
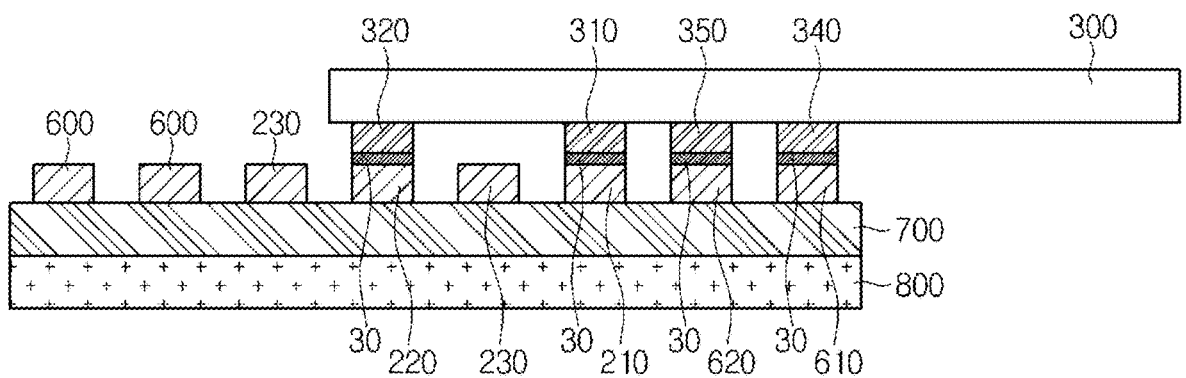

Then, as shown in FIG. 35, the soldering process is performed to connect the coil unit 200 and the short-range communication antenna 600 to the connecting unit 300. According to one embodiment, the soldering process includes the reflow process, but the embodiment is not limited thereto. The reflow process refers to the process for bonding the coil unit 230 and the short-range communication antenna 600 with the connecting unit 300 by melting solder cream using high-temperature heat to ensure the stable electrical connection between the connecting unit 300 and the coil unit 230/NFC antenna 600.

The first connection terminal 310 of the connecting unit 300 may be connected to the first connection terminal 210 of the coil unit 200 by a solder 30, the second connection terminal 320 of the connecting unit 300 may be connected to the second connection terminal 220 of the coil unit 200 by the solder 30, the third connection terminal 340 of the connecting unit 300 may be connected to the first connection terminal 610 of the short-range communication antenna 600 by the solder 30 and the fourth connection terminal 350 of the connecting unit 300 may be connected to the second connection terminal 620 of the short-range communication antenna 600.

Figure 36:
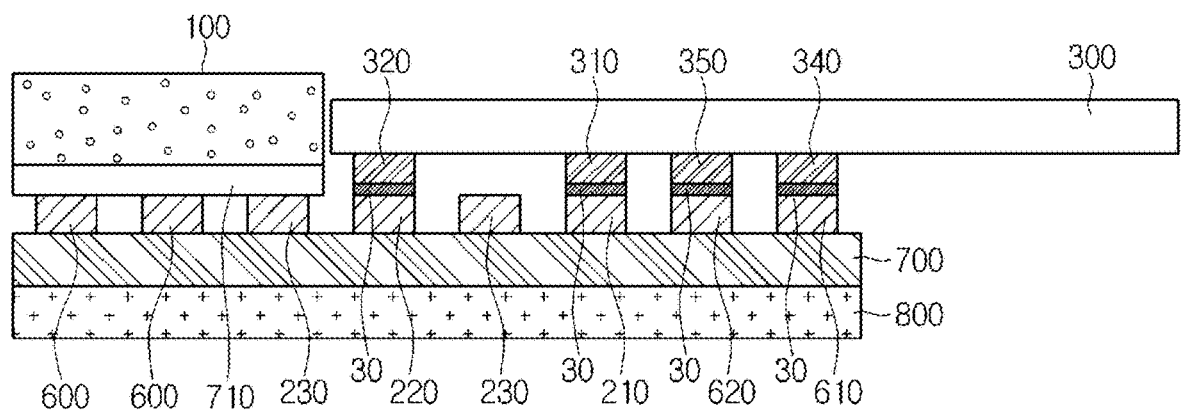

Then, as shown in FIG. 36, the magnetic substrate 100 is laminated on a predetermined portion of the conductive pattern where the connecting unit 300 is not present. In detail, the magnetic substrate 100 may be laminated on the top surfaces of the coil 230 and the short-range communication antenna 600.

Prior to the above, the receiving space corresponding to the connecting unit 300 can be formed at the magnetic substrate 100. The receiving space of the magnetic substrate 100 may have the shape identical to the shape of the connecting unit 300.

As described above with reference to FIG. 26, since the connecting unit 300 is disposed in the receiving space 130 of the magnetic substrate 100, the thickness of the wireless power receiver 1000 can be remarkably reduced as much as the thickness of the connecting unit 300. Thus, the thickness of the electronic device, such as a portable terminal, equipped with the wireless power receiver 1000 can be remarkably reduced.

The coil 230/short-range communication antenna 600 and the magnetic substrate 100 may be adhered with each other by the first dual-side adhesive layer 710. According to one embodiment, the magnetic substrate 100 may have the thickness in the range of 100 μm to 800 μm, but the embodiment is not limited thereto. According to one embodiment, the first dual-side adhesive layer 710 may have the thickness in the range of 10 μm to 50 μm, but the embodiment is not limited thereto.

Figure 37:
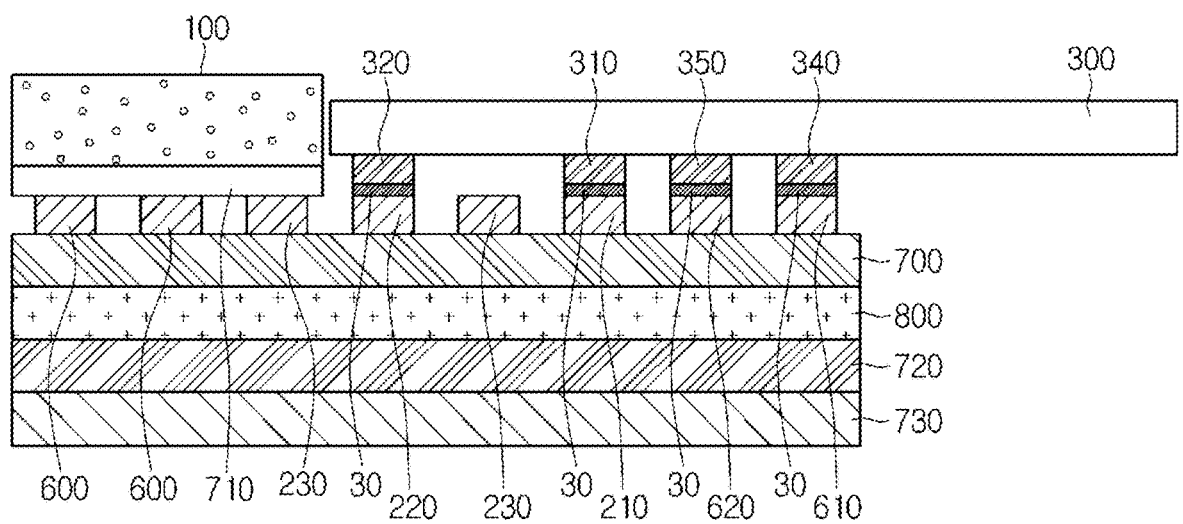

After that, as shown in FIG. 37, the release paper layer 730 is attached to one side of the protective film 800 by interposing the second dual-size adhesive layer 720 therebetween. The release paper layer 730 is a paper layer for protecting the second dual-size adhesive layer 720 and may be removed when the wireless power receiver is disposed in a case of an electronic device, such as a portable terminal.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wireless power receiver, comprising:
a magnetic substrate comprising a first receiving space and a second receiving space;
a coil on the magnetic substrate;
a first connection terminal connected to an outer end of the coil;
a second connection terminal connected to an inner end of the coil; and
a connecting unit comprising a third connection terminal connected to the first connection terminal, and a fourth connection terminal connected to the second connection terminal,
wherein the first connection terminal and the third connection terminal overlap the first receiving space in a vertical direction perpendicular to the magnetic substrate,
wherein the second connection terminal and the fourth connection terminal overlap the second receiving space in the vertical direction, and
wherein the connecting unit comprises:
a wiring layer connected to the third connection terminal and the fourth terminal.

2. The wireless power receiver of claim 1, wherein the first receiving space is positioned outside the coil, and
wherein the second receiving space is positioned inside the coil.

3. The wireless power receiver of claim 1, wherein the wiring layer is connected to a receiving circuit, and
wherein the receiving circuit is disposed outside the first receiving space and the second receiving space.

4. The wireless power receiver of claim 1, wherein the connecting unit comprises:
a first region on which the third connection terminal is disposed;
a second region on which the fourth connection terminal is disposed; and
a third region connecting the first region and the second region,
wherein the third region overlaps the coil in the vertical direction.

5. The wireless power receiver of claim 4, wherein the connecting unit comprises:
a fourth region not overlapping the magnetic substrate in the vertical direction.

6. A wireless power receiver, comprising:
an adhesive layer comprising a receiving space;
a coil on the adhesive layer;
a first connection terminal connected to an outer end of the coil;
a second connection terminal connected to an inner end of the coil; and a connecting unit overlapping the receiving space in a vertical direction perpendicular to the adhesive layer,
wherein the connecting unit comprises:
a third connection terminal connected to the first connection terminal;
a fourth connection terminal connected to the second connection terminal; and
a wiring layer connected to the third connection terminal and the fourth terminal.

7. The wireless power receiver of claim 6, wherein the receiving space extends from inside the coil to outside the coil.

8. The wireless power receiver of claim 6,
wherein the wiring layer is connected to a receiving circuit, and
wherein the receiving circuit is disposed outside the first receiving space and the second receiving space.

9. The wireless power receiver of claim 6, wherein the connecting unit comprises:
a first region on which the third connection terminal is disposed;
a second region on which the fourth connection terminal is disposed; and
a third region connecting the first region and the second region,
wherein the third region overlaps the coil in the vertical direction.

10. The wireless power receiver of claim 9, wherein the connecting unit comprises:
a fourth region not overlapping the adhesive layer in the vertical direction.

11. A wireless power receiver, comprising:
a magnetic substrate comprising a first receiving space and a second receiving space;
a coil on the magnetic substrate;
a first connection terminal connected to one end of the coil;
a second connection terminal connected to an other end of the coil; and
a connecting unit comprising a third connection terminal connected to the first connection terminal, and a fourth connection terminal connected to the second connection terminal,
wherein the first connection terminal and the third connection terminal is disposed corresponding to the first receiving space,
wherein the second connection terminal and the fourth connection terminal is disposed corresponding to the second receiving space,
wherein the connecting unit comprises a wiring layer connected to the third connection terminal and the fourth terminal.

12. The wireless power receiver of claim 11, wherein the first receiving space is positioned outside the coil, and
wherein the second receiving space is positioned inside the coil.

13. The wireless power receiver of claim 11, wherein the wiring layer is connected to a receiving circuit, and
wherein the receiving circuit is disposed outside the first receiving space and the second receiving space.

14. The wireless power receiver of claim 11, wherein the connecting unit comprises:
a first region on which the third connection terminal is disposed;
a second region on which the fourth connection terminal is disposed; and
a third region on the coil.

15. The wireless power receiver of claim 14, wherein the connecting unit comprises:
a fourth region which is not disposed on the magnetic substrate.

16. A wireless power receiver, comprising:
an adhesive layer comprising a receiving space;
a coil on the adhesive layer;
a first connection terminal connected to one end of the coil;
a second connection terminal connected to an other end of the coil; and
a connecting unit disposed corresponding to the receiving space,
wherein the connecting unit comprises:
a third connection terminal connected to the first connection terminal;
a fourth connection terminal connected to the second connection terminal; and
a wiring layer connected to the third connection terminal and the fourth terminal.

17. The wireless power receiver of claim 16, wherein the receiving space extends from inside the coil to outside the coil.

18. The wireless power receiver of claim 16, wherein the wiring layer is connected to a receiving circuit, and
wherein the receiving circuit is disposed outside the first receiving space and the second receiving space.

19. The wireless power receiver of claim 16, wherein the connecting unit comprises:
a first region on which the third connection terminal is disposed;
a second region on which the fourth connection terminal is disposed; and
a third region on the coil.

20. The wireless power receiver of claim 19, wherein the connecting unit comprises:
a fourth region which is not disposed on the adhesive layer.

* * * * *

(12) INTER PARTES REVIEW CERTIFICATE (3493rd)

United States Patent
Lee et al.

(10) Number: US 10,804,740 K1
(45) Certificate Issued: Mar. 12, 2024

(54) WIRELESS POWER RECEIVER AND METHOD OF MANUFACTURING THE SAME

(71) Applicants: Jung Oh Lee; Yang Hyun Kim; Jeong Wook An; Sung Hyun Leem

(72) Inventors: Jung Oh Lee; Yang Hyun Kim; Jeong Wook An; Sung Hyun Leem

(73) Assignee: SCRAMOGE TECHNOLOGY LIMITED

Trial Number:

IPR2022-00118 filed Oct. 29, 2021

Inter Partes Review Certificate for:

Patent No.: 10,804,740
Issued: Oct. 13, 2020
Appl. No.: 16/264,360
Filed: Jan. 31, 2019

The results of IPR2022-00118 are reflected in this inter partes review certificate under 35 U.S.C. 318(b).

INTER PARTES REVIEW CERTIFICATE
U.S. Patent 10,804,740 K1
Trial No. IPR2022-00118
Certificate Issued Mar. 12, 2024

AS A RESULT OF THE INTER PARTES REVIEW PROCEEDING, IT HAS BEEN DETERMINED THAT:

Claims 6, 7, 16, 17, 19 and 20 are found patentable.

\* \* \* \* \*